(12) United States Patent
Kobayashi

(10) Patent No.: US 7,535,701 B2
(45) Date of Patent: May 19, 2009

(54) CASE FOR COMPUTER AND METHOD OF PRODUCING THE CASE

(75) Inventor: Toshihiro Kobayashi, Tokyo (JP)

(73) Assignee: Grow Up Japan, Inc., Tokyo (JP)

( * ) Notice: Subject to any disclaimer, the term of this patent is extended or adjusted under 35 U.S.C. 154(b) by 215 days.

(21) Appl. No.: 10/518,288

(22) PCT Filed: Jun. 20, 2003

(86) PCT No.: PCT/JP03/07893

§ 371 (c)(1),
(2), (4) Date: Feb. 15, 2006

(87) PCT Pub. No.: WO04/001565

PCT Pub. Date: Dec. 31, 2003

(65) Prior Publication Data

US 2006/0187627 A1    Aug. 24, 2006

(30) Foreign Application Priority Data

Jun. 21, 2002   (JP) .............................. 2002-182257

(51) Int. Cl.
*H05K 5/00*       (2006.01)
(52) U.S. Cl. .................. 361/683; 312/265.1; 312/223.2
(58) Field of Classification Search ................. 361/685, 361/683; 312/223.2, 265.1
See application file for complete search history.

(56) References Cited

U.S. PATENT DOCUMENTS

| 3,751,127 | A | * | 8/1973 | Black et al. | .................. 312/111 |
| 5,020,866 | A | * | 6/1991 | McIlwraith | .............. 312/265.4 |
| 6,049,452 | A | * | 4/2000 | You et al. | .................... 361/685 |
| 6,168,249 | B1 | * | 1/2001 | Chien | ....................... 312/265.4 |
| 6,377,446 | B1 | * | 4/2002 | Liau | ............................ 361/683 |
| 6,920,042 | B2 | * | 7/2005 | Yuan et al. | .................. 361/685 |

FOREIGN PATENT DOCUMENTS

| JP | 10 303 579 | 11/1998 |
| JP | 30 660 62 | 2/2000 |
| JP | 3068582 | 5/2000 |
| JP | 30 769 11 | 4/2001 |
| JP | 30 862 92 | 6/2002 |

* cited by examiner

*Primary Examiner*—Lisa Lea-Edmonds
*Assistant Examiner*—Ingrid Wright
(74) *Attorney, Agent, or Firm*—Lowe Hauptman Ham & Berner, LLP

(57) ABSTRACT

A case for a computer has a solid shape formed by outer panels assembled together into which are installed bays for mounting modules. Switches and insertion/removal openings for external storage modules are provided on front side of the case. Connectors are at least provided on a rear side. The frame members comprise outer frames that are arranged so as to form an outline of each face of the solid shape. Corner parts are arranged at the corners of the sold shape and connect adjacent outer frames.

7 Claims, 30 Drawing Sheets

(a)

(b)  (c)

(a)

(b)

(a)

(b)

(a)

(b)

(a)

(b)

(a)

(b)

(a)

(b)

(a)

(b)

CASE FOR COMPUTER AND METHOD OF PRODUCING THE CASE

FIELD OF THE INVENTION

The present invention relates to a case for computer and method of producing the case, especially a case for computer that enables a user to freely modify the design of the case as desired, and method of producing such a modifiable case.

BACKGROUND OF THE INVENTION

Conventional computers are described in many publications of patents or utility models. These computers are selectively equipped, so as to ensure the computer's performance, with (1) a power source, (2) printed circuit boards, (e.g. mother board on which CPU are installed), (3) internal storage modules such as a HDD (hard disk drive) and the like, and (4) external storage modules such as an FDD (floppy disk drive), a CD (compact disk) drive, a DVD (digital versatile drive), an optical disk drive, a smart card and the like; and these devices are arranged in the computer's case. Such a case for a desktop-type or tower-type computer typically has a standard shape and size, and such cases have been designed by manufacturers with mass production and economic efficiency in mind. (See Patent Documents 1 and 2.)

Patent Document 1:

Japanese Unexamined Patent Publication No. 2001-350542 (pp. 3-10, FIG. 1)

Patent Document 2:

Japan Utility Model No. 3066596

As described above, conventional computers have only standard functions because the components are assembled in cases whose shapes and sizes are determined by manufacturers. Therefore, when adding an additional component, such as a disk-drive, to a computer, the computer needs to be connected—either by a wire or wirelessly—to said component that can provide such additional functions. This results in the problem of peripheral components being scattered around the computer, which requires a large space and can causes a mess on the desk.

The exterior of a conventional case cannot be modified because it has a standard shape and size. Thus, a user cannot have a design that he or she desires, which is unsatisfactory. Moreover, because the exterior of the case has a standard shape and size, a large package, and thus a large space, are needed for transportation, resulting in high transportation costs.

The present invention solves the above problems. The objectives of the present invention are to provide a light and compact case for computer and methods of manufacturing said case, allowing a user to freely design the case, to easily assemble and disassemble it, and to freely add any components to it without resulting in a messy desktop or requiring a bulky package for transportation.

DISCLOSURE OF THE INVENTION

The object of the invention described in Claim 1 is to provide a case for computer having a solid shape formed by a plurality of outer panels assembled together, and into which are installed bays for mounting modules for computer, comprising at least switches and insertion/removal openings for external storage modules on front side and at least connectors on rear side; wherein (1) the outer panels are removably installed by using screws on outside of frame members that form outline of the solid shape, (2) the frame members comprise, (a) inner frames that are arranged so as to form outline of each plane of the solid shape, (b) corner parts that are arranged at corners of the inner frames and that connect the adjacent inner frames, (c) outer frames that bridge the adjacent corner parts and are affixed onto the inner frames, (3) the inner frames, the corner parts, and the outer frames are assembled by using screws, so that the case is easy to disassemble.

The present invention provides—through assembling the inner frames, the corner parts, and the outer frames—the frame members that form outline of the solid shape of the case. Therefore, by affixing outer panels to outside of the frame members, a case for computer can be formed easily. Screws are used for assembling, resulting in easy assembly and disassembly.

This structure appeals to users because—due to the fact that the outer panels can easily be affixed and removed, and the frame members can easily be assembled and disassembled—it allows the user to choose both the components of the frame member and the outer panels, thereby enabling the user to freely design and modify the overall shape and size of the case for computer. And because this invention makes it possible to select the components of the frame members and the outer panels according to the shape and size of the modules to be added, such modules can easily be put into the case, thus avoiding a messy desktop. Further, because such a case is easy to disassemble, the need for a bulky package for transporting it can be avoided, enabling easy transportation.

The computer case described in Claim 2 comprises:

a first unit case, which has a solid shape into which are installed at least a bay for external storage module and a bay for boards, including a motherboard, a second unit case, which has a solid shape into which is installed a bay for power module, and a third unit case, which has a solid shape into which is installed a bay for internal storage module, wherein (1) the outer panels are removably installed by using screws on outside of frame members that form outline of each of the solid shape of the first, second, and third unit cases (2) the frame members comprise, (a) inner frames that are arranged so as to form outline of each plane of the solid shape, (b) corner parts that are arranged at corners of the inner frames and that connect the adjacent inner frames, (c) outer frames that bridge the adjacent corner parts and are affixed onto the inner frames, (3) the inner frames, the corner parts, and the outer frames are assembled by using screws, so that the case is easy to disassemble.

In the present invention, again, the frame members of first, second, and third unit cases are easy to disassemble, and the outer panels are easy to affix to and remove from said frame members. Therefore, a user can freely and enjoyably design the case for computer as a whole, and additional modules can be put into the case, thereby avoiding a messy desktop. Further, the case can be disassembled and all of its all the components removed for transportation, avoiding the need for a bulky package and greatly reducing the cost of transportation.

The invention described in Claim 3 provides a case for computer as described in Claim 2, wherein the second and third unit cases can be affixed onto the rear of the first unit case.

The second and third unit cases are not viewable from the front, so that the outer appearance of the case is improved. Moreover, heat from both the power source and the internal storage devices can be emitted toward the back of the case.

The invention described in Claim 4 provides a case for computer as described in Claim 2, wherein installing panels—for external storage modules, internal devices such as a motherboard and switches, a power module, and internal storage modules—are installed within the first, second, and third unit cases by using screws, so that said panels can easily be installed and removed.

By providing installing panels that are easy to install and remove, it facilitates the exchange of components and ensures stable installation of components within the case, as well as stable assembly.

The invention described in Claim 5 provides a case for computer having a solid shape formed by a plurality of outer panels assembled together, and into which are installed bays for mounting modules for computer, comprising at least switches and insertion/removal openings for external storage modules on front side and at least connectors on rear side;

wherein (1) the outer panels are removably installed by using screws on outside of frame members that form outline of the solid shape, (2) the frame members comprise, (a) outer frames that are arranged so as to form outline of each plane of the solid shape, (b) corner parts that are arranged at corners of the solid shape and that connect adjacent outer frames, (3) the outer frames and the corner parts are assembled by using screws, so that the case is easy to disassemble.

The present invention enables the frame members that form outline of the solid shape, to be easy to assemble and disassemble, using only the outer frames and corner parts. As a result, a user can select the design for a computer freely and enjoyably, and can install additional modules into the case, thereby avoiding a messy desktop. Further, the case can be disassembled and all of its components removed for transportation, thereby avoiding the need for a bulky package and also greatly reducing the cost of transporting the computer.

The invention described in Claim 6 provides a case for computer as described in Claim 5, wherein a disk-drive bay in which a plurality of large and small disk drives serving as internal and external storage modules can be installed under the condition that they are stacked, with the disk-drive bay comprising:

(1) a pair of left-side and right-side first angle panels that (a) are arranged across two vertically stacked large disk drives and sustain the two drives from their respective sides, and (b) affixed to top face of a bay-fixing panel that is affixed to an outer frame that forms bottom plane of the case, (2) a plurality pairs of left-side and right-side second angle panels that (a) are sequentially arranged across adjacent two of a plurality of vertically stacked large disk drives that are placed on the aforementioned upper large hard disk drive, and (b) sustain the two adjacent drives from their respective sides, and (3) left-side and right-side third angle panels that (a) sustain a small disk drive that is stacked atop the uppermost large disk drive from its respective sides, and (b) are affixed respectively to the left-side and right-side second angle panels that are arranged at the uppermost large disk drive, and wherein (4) a plurality of second angle panels that have the same shape as the aforementioned second angle panels, can be installed consecutively (1) by being arranged across vertically adjacent two of a plurality of third left-side and right-side third angle panels that have the same shape as the aforementioned third angle panels, and that sustain one by one a plurality of small disk drives that are stacked successively on the aforementioned small disk drive from their respective sides, and (2) by fixing the two adjacent third angle panels (5) a plurality of aforementioned large and small disk drives are stacked, through (a) the pair of the left-side and right-side first panels, (b) the plurality pairs of the second, left-side and right-side panels, and (c) the left-side and right-side third angle panels, being affixed to the panels by using screws, so that the case is easy to disassemble.

The present invention provides a disk-drive module bay that allows large and small disk drives to be stacked one upon another by using a pair of left-side and right-side first angle panels and a plurality of pairs of second and a third left-side and a right-side angle panels, without (a) limiting the numbers of large and small disk drives or (b) requiring separate bays. unlike in the conventional case of an external storage module bay (for installing 3.5-inch and 5-inch disk drives) and an internal storage module bay (for installing HDD). Therefore, a user can freely and enjoyably design a computer case that will allow additional modules to be put into the case, thereby avoiding a messy desktop. The whole case is light and compact. Moreover, both the case and the disk drive modules can be disassembled for transportation, thereby avoiding the need for a bulky package and greatly reducing the cost of transporting the case.

The invention described in Claim 7 provides a case for computer as described in Claim 6, wherein (1) the first angle panels (a) have a fixing flange to be affixed to top face of the bay-fixing panel by using screws, and (b) have flat installing portions that are installed consecutively to the fixing flange and are inflected into L-shaped cross-section and are arranged across the two vertically adjacent large hard disk drives and are affixed to the sides of the two drives by using screws, (2) the second angle panels have flat installing portions that are arranged across the two vertically adjacent large hard disk drives and are affixed to the sides of the two drives by using screws, (3) the left-side and right-side third angle panels have (a) flat installing portions that are installed, by using screws, to their respective sides of a small disk drive that is stacked on the uppermost of the stack of large disk drives, and (b) fixed parts that are installed consecutively to the flat installing portions of the third angle panels and are inflected into a crank-shaped cross-section so as to protrude outwards to both left and right sides and that are to be affixed, by using screws, to the flat installing portions of the second left-side and right-side angle panels that are arranged atop the uppermost large disk drives, and that is such that (4) the flat installing portions of the second angle panels and the fixed parts of the left-side and right-side third angle panels can be arranged across and connected with vertically adjacent two each other.

In this invention, the first, second, and left-side and right-side third angle panels are thin, flat metal plates, and are formed so as to be compact and light in weight, so that a user can freely select a computer-case design, allowing additional modules easily to be put into the case, thereby avoiding the need for a bulky package, and thereby greatly reducing the cost of transporting the case.

The invention described in Claim 8 provides a case for computer as described in Claim 7, wherein (1) engagement parts on upper end of the flat installing portions of the first angle panels and lower end of the flat installing portions of the second angle panels so as to fix position at which the first and second panels contact each other, and (2) other engagement parts on the upper end of the flat installing portions of the second angle panels and the lower end of the flat installing portions of the other second angle panels, which are arranged in such a way that said other second angle panels are adjacent to each other, so as to fix position at which said first and second angle panels contact each other.

In this invention, the first angle panels and the second angle panels have engagement parts so as to fix position at which said panels face each other. Therefore, using a pair of the left-side and right-side first angle panels, a plurality of second angle panels and left-side and right-side third angle panels enable easy positioning and ensure assembly of a desired number of large/small external storage modules are stacked one upon another, without forming a gap in front of and behind modules.

The invention described in Claim 9 provides a case for computer as described in Claim 6, wherein a disk-drive bay in which at least one of each large and small disk drives can be installed under the condition that they are stacked, with said disk-drive bay comprising (1) a pair of left-side and right-side first angle panels that sustain the large disk drive(s) from their respective sides, and affixed to bottom face of a bay-fixing panel that is affixed to an outer frame that forms top plane of the case (2) left-side and right-side third angle panels that (a) hold a small disk drive that is placed at the bottom of the large disk drive from its respective sides, and (b) are affixed respectively to the left-side and right-side first angle panels (3) the large and small disk drives are stacked, through pairs of said left-side and right-side first and third angle panels, being affixed to the panels by using screws, so that the disk drives can easily be removed.

The present invention provides that the case for a space-saving micro-tower-type or minitower-type computer that has a motherboard with Pentium™ 4, for instance, is constructed so as to be compact and lightweight, by affixing the stack of large and small disk drives by using a pair of first angle panels and left-side and right-side third angle panels to bottom face of the bay-fixing panel at the upper panels of the case. Further, the case and all of its related components can be disassembled for transporting, avoiding the need for a bulky package and greatly reducing the cost of transporting the computer.

Claim 10 describes a case for computer as described in Claim 9, wherein the pair of left-side and right-side first angle panels and left-side and right-side third angle panels as described in Claim 9, with said first angle panels having the same shape as those of the first angle panels in Claim 7 or Claim 8, and said third angle panels having the same shape as the left-side and right-side third angle panels in Claim 7.

The present invention provides that the first angle panels and the left-side and right-side third angle panels can be used in common for computer cases ranging from large tower types in which a plurality of large/small external/internal storage devises are stacked and assembled, or medium-size tower types to compact minitower types in which a single large storage module and a single, small storage module, external or internal, are assembled.

Further, the second angle panels can be used in common for computer cases ranging from full-size tower types or middle-size tower types to minitower types.

Therefore, the costs of designing and manufacturing the external and internal storage module bays are reduced, allowing a user to select a design freely and enjoyably, and to add expansion modules into the case as desired. Further, the case and all of its related components can be disassembled for transportation, avoiding the need for a bulky package and greatly reducing the cost of transporting the computer.

Claim 11 provides a method of manufacturing a case for computer having a solid shape formed by a plurality of outer panels assembled together, and into which are installed bays for mounting modules for computer, with said method comprising (1) a first step of assembling frame members that form outline of the solid shape, in such a way that disassembly is easy, by (a) arranging inner frames so as to form outline of each plane of the solid shape, (b) arranging corner parts at corners of the inner frames, (c) connecting the adjacent inner frames, and (d) affixing outer frames onto the inner frames with bridging the adjacent corer parts, and (2) a second step of affixing the outer panels to the outside of the frame members, by using screws, in a manner that makes the case easy to disassemble.

Thus, the first step involves assembling the frame members, and the second step involves attaching outer panels to the frame members, resulting in easy assembly of the case.

Claim 12 provides a method of manufacturing a case for computer having a solid shape into which are installed bays for mounting modules for computer and onto which a plurality of outer panels are affixed, with said method comprising (1) a first step of assembling frame members that form outline of the solid shape, in such a way that disassembly is easy, by (a) arranging outer frames so as to form outline of each plane of the solid shape, (b) arranging corner parts at corners of the outer frames, (c) connecting the adjacent outer frames, and (2) a second step of affixing the outer panels to the outside of the frame members, by using screws, in a manner that makes the case easy to disassemble.

In the present invention, the frame member comprises only the outer panels and the corner parts, so that first step of assembling the frame members is simplified. That is followed by the second step, which is to affix the outer panels to the frame members, so that assembly of the case is further simplified.

DESCRIPTION OF THE PREFERRED EMBODIMENTS

Preferred embodiments of the present invention will now be described with reference to the drawings.

The first embodiment of the present invention is a middle-tower-type case for computer, which consists of three unit cases: a first unit case 101, a second unit case 102, and a third unit case 103, as shown in FIGS. 1 through 6. Unit cases 101, 102, and 103 constitute a case for computer.

Figure 3:
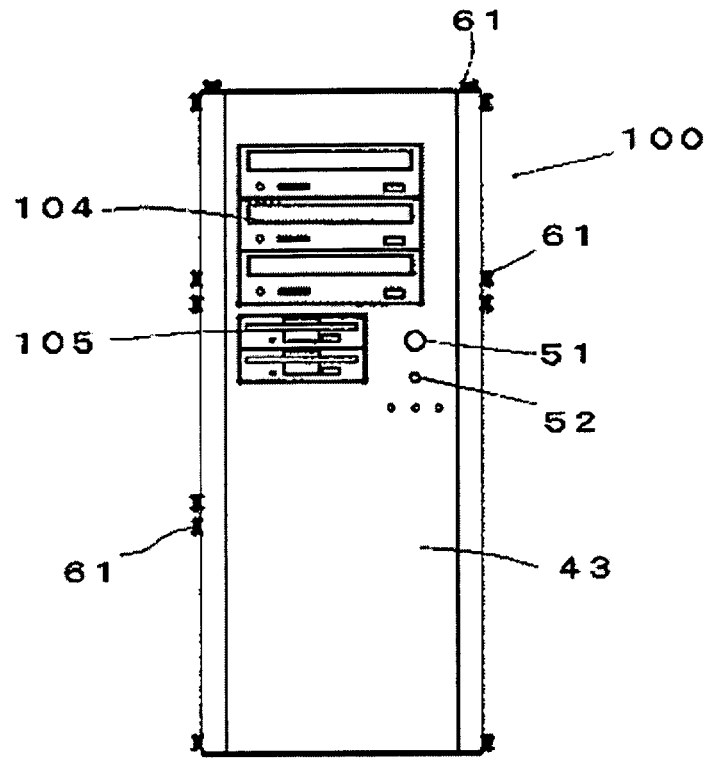
FIG. 3 is a view of the front of the case shown in FIG. 1.
Figure 4:
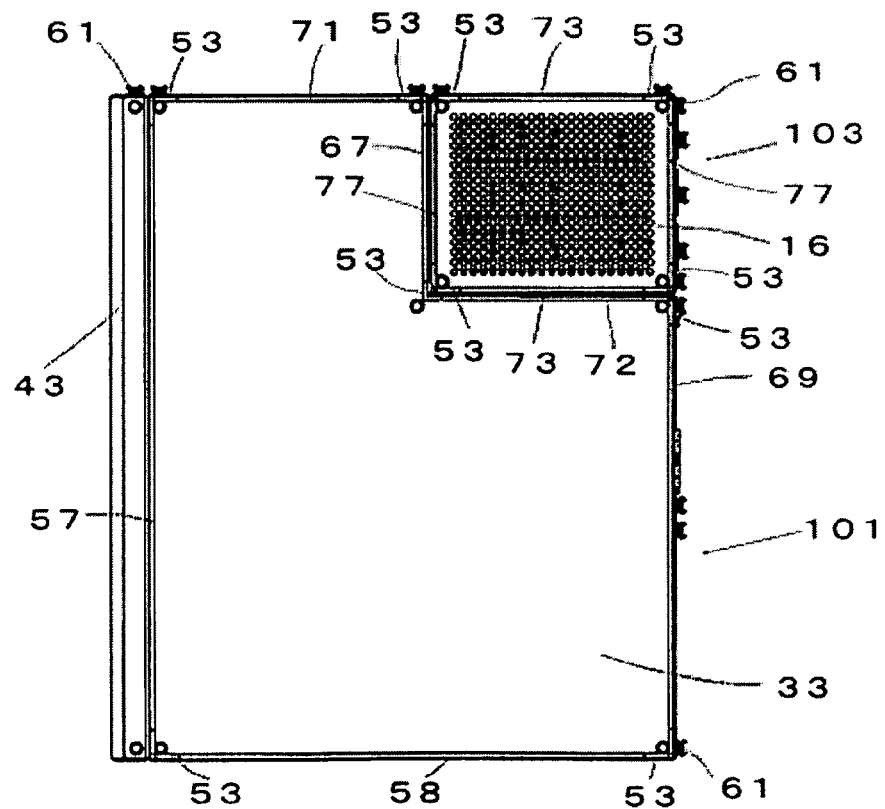
FIG. 4 is a view of the right side of the case shown in FIG. 1.
Figure 5:
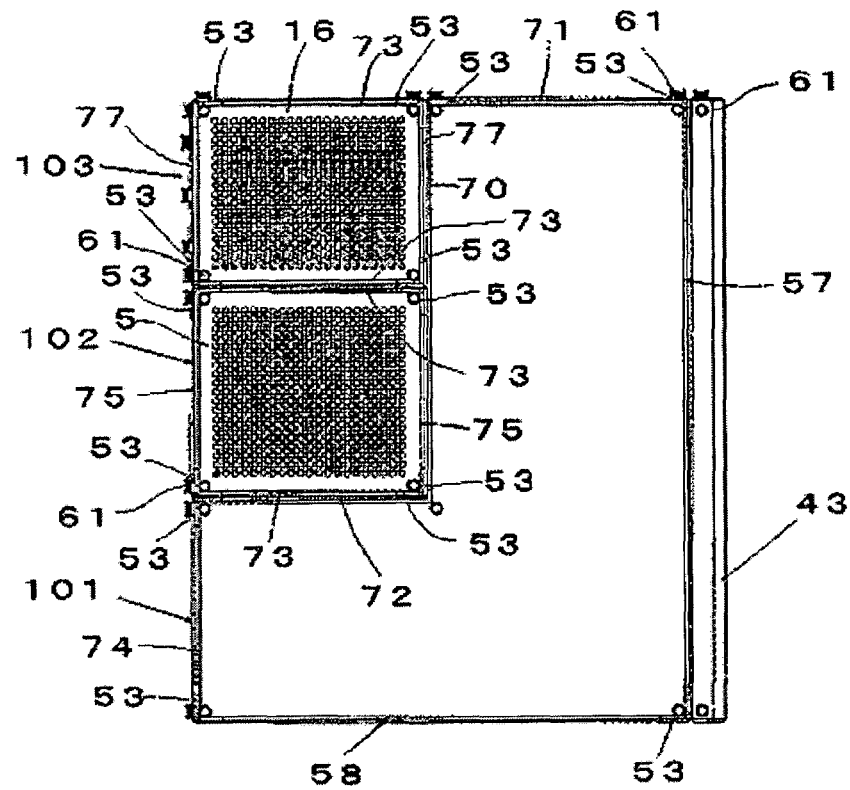
FIG. 5 is a view of the left side of the case shown in FIG. 1.
Figure 6:
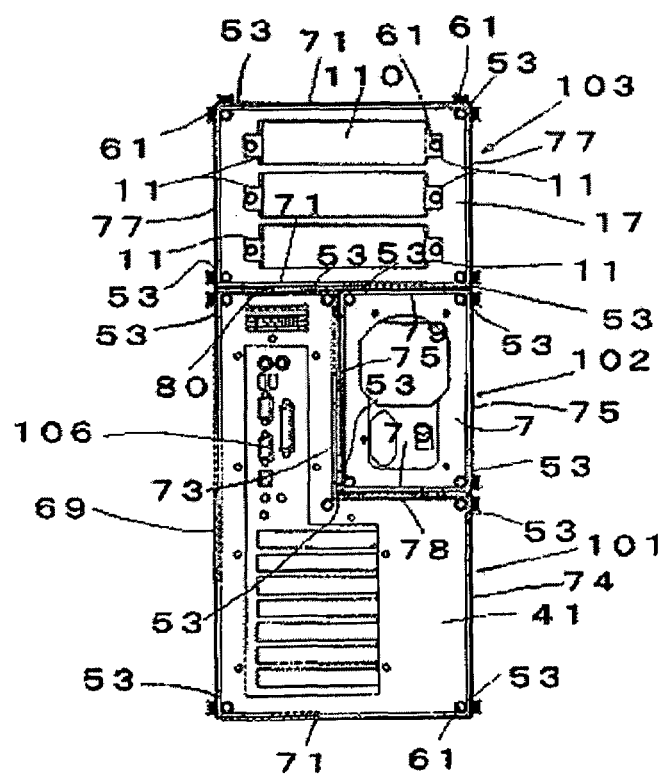
FIG. 6 is a view of the rear of the case shown in FIG. 1.
Figure 7:
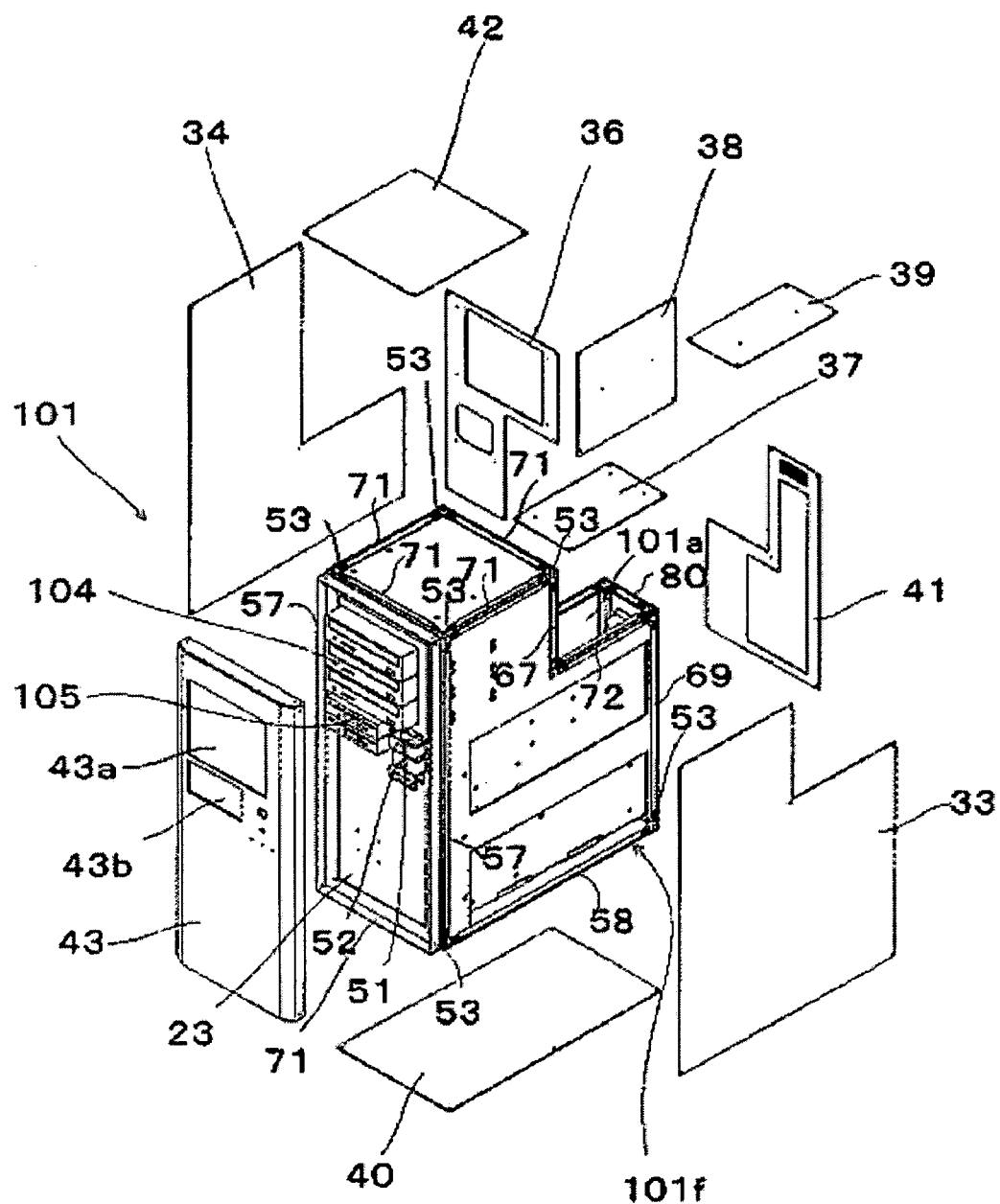
FIG. 7 is a perspective view of a disassembled first unit case that is the first embodiment of the present invention.

The first unit case 101 houses, as shown in FIGS. 3 and 7, external storage modules 104 (e.g. 5-inch disk drive) and 105 (e.g. 3.5-inch disk drive), and a board (such as a motherboard), an audio card, a video card, and other devices (not shown) for a PC. The second unit case 102 houses a power module 109 (see FIG. 17), and the third unit case 103 houses internal storage modules such as hard disk drivea 110 (see FIG. 19).

Figure 1:
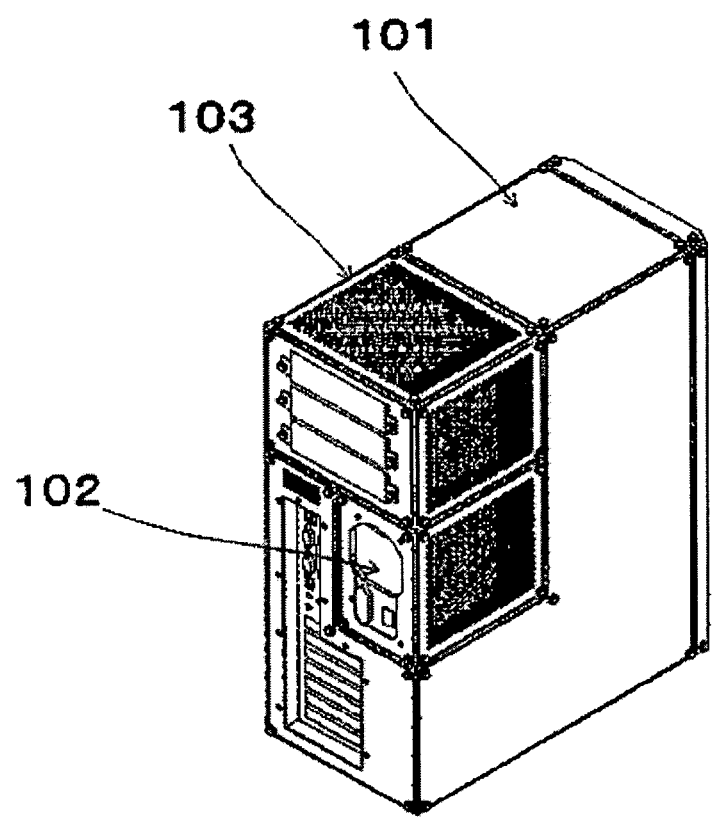
FIG. 1 is a rear perspective view of a case for computer that is the first embodiment of the present invention.
Figure 2:
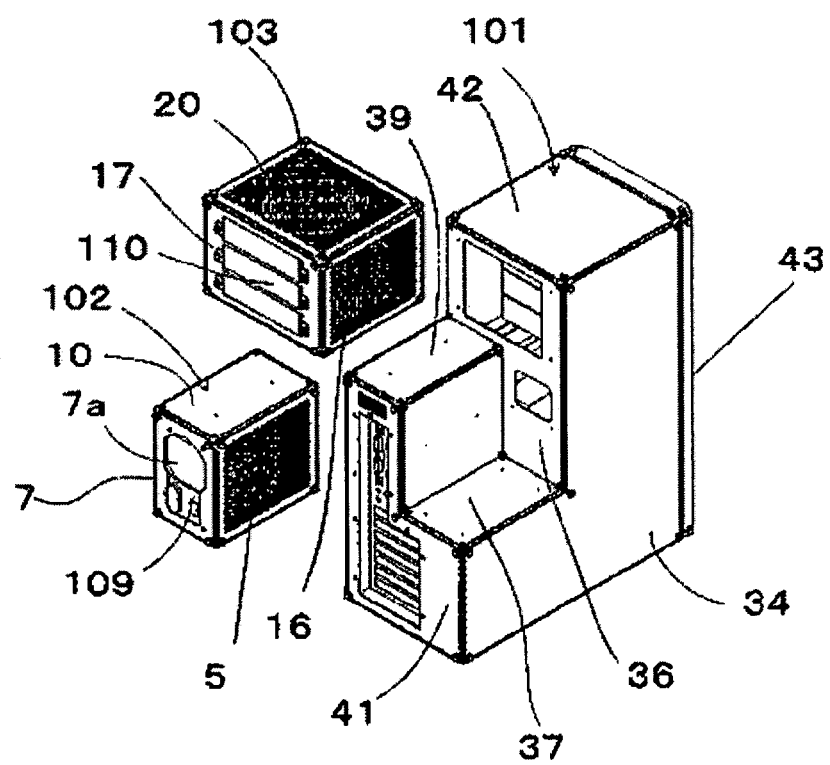
FIG. 2 is a rear perspective view of a partially disassembled case for computer that is the first embodiment of the present invention.

The first unit case 101, as shown in FIGS. 1 and 2, has horizontal place parts (outer panels 37, 39) that are parallel to each other but arranged at different heights on the case's rear side. The second unit case 102 is positioned atop lower place part (outer panel 37), while the third unit case 103 is positioned atop higher place part (outer panel 39). Also, part of the third unit case 103 sits atop the second unit case 102. In this arrangement, the outer surfaces of the second unit case 102 and the third unit case 103 align with both of the side surfaces (outer panels 33, 34) of the first unit case 101, while the top panel (outer panel 42) of the first unit case 101 and the upper panel (outer panel 20) of the third unit case 103 are aligned on the same level. Therefore, the whole case becomes a tower-type computer having an exterior that has a rectangular parallelepiped shape. In such an arrangement, in which the second unit case 102, which contains the power module 109, and the third unit case 103, which contains the internal storage modules 110, are positioned to the rear of the first unit case 101, the second and the third unit cases are not viewable from the front of the computer, which improves the appearance of the case, and heat from the power module 109 and the internal storage module 110 is emitted to the rear of the case.

The outer panel 5 of one side of the second unit case 102 that houses the power module 109 is made of punching metal, and the outer panel 7 on the back side of the second unit case 102 has an exhaust opening 7*a*. Air comes into the second unit case 102 via the outer panel 5 and goes out via the opening 7*a*, resulting in good dispersal of heat. The outer left-side and right-side panels 16 and the upper panel 20 of the third unit case 103 that houses the internal data-storing devices 110 are made of punching metal, also resulting in good dispersal of heat.

External storage modules 104 of the first unit case 101 are 5-inch disk drives (e.g. a CD/CD-RW drive, a DVD drive, an optical disk drive, and the like), while external storage modules 105 are 3.5-inch disk drives (e.g. floppy disks drive and the like) that are installed under the external storage modules 104. In order to house the external storage modules 104 and 105, the first unit case 101 is provided with external storage module bays (not shown) at the appropriate places. In FIG. 7, 101a is a board bay for housing boards (including the motherboard) and other devices for PC.

At the front of the first unit case 101 are properly installed a main switch 51 for turning on the computer, a reset button 52 for restarting the computer, and indicator lamps (LED) such as a power indicator lamp and an access lamp. At the rear of the first unit case 101 are connectors 106 to communicate with the power supply, a display, a scanner, other computers and other electronic devices.

FIG. 7 is a perspective view that shows a first unit case 101 in a state of assembly and disassembly.

The first unit case 101 comprises a frame member 101f onto which a plurality of outer panels 33, 34, and 36-43 are affixed so as to cover outside of said first unit case 101. The frame member 101f is formed to be outline (outer shell) of a solid shape of the first unit case 101 and by installing the outer panels 33, 34, and 36-43 on the frame member 101f, the unit case 101 is made to have an exterior as shown in FIG. 2. The outer panel 43 serves as a front cover (front panel) of the computer, and windows 43a and 43b, which provide access to the external storage modules 104 and 105, are formed so that their positions align with those devices.

Figure 8:
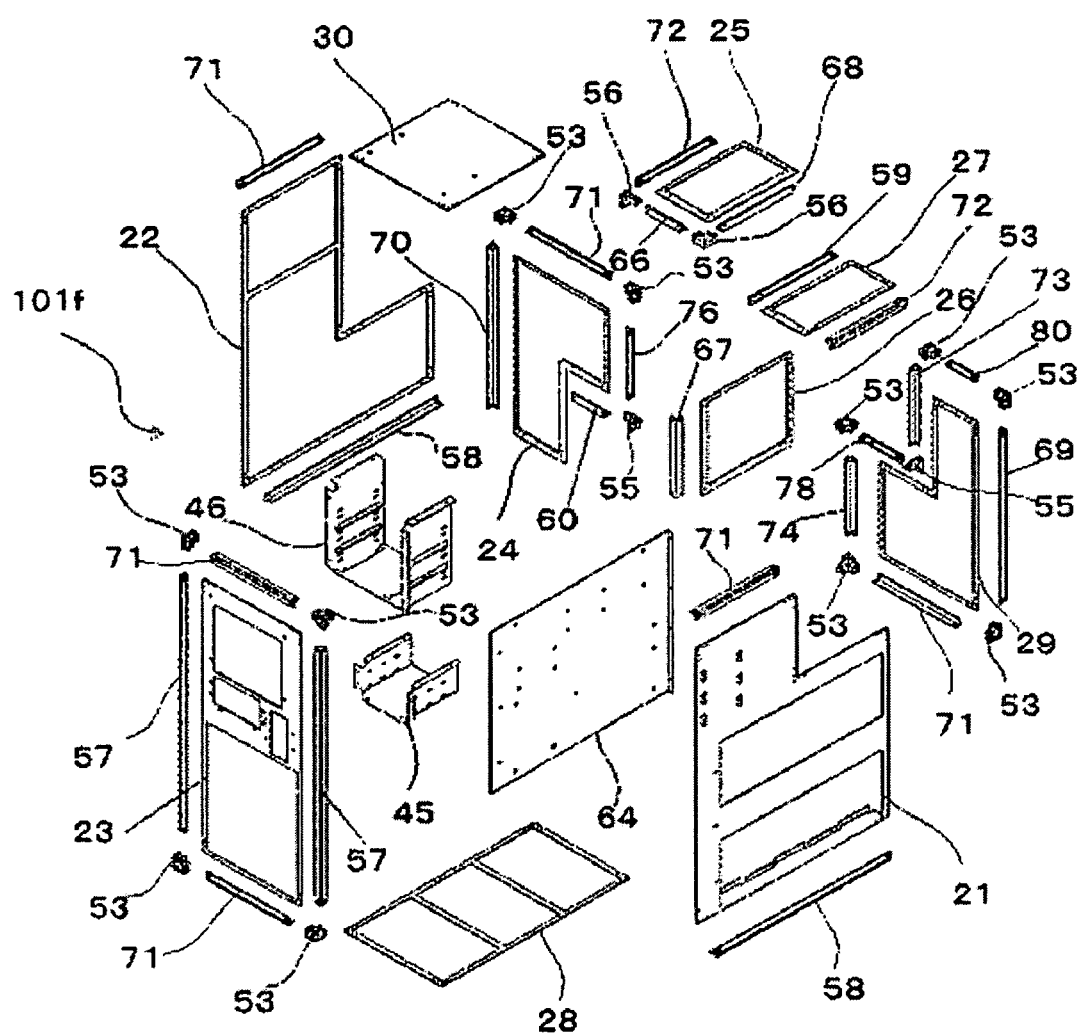
FIG. 8 is a perspective view of a disassembled frame member of the first unit case that is the first embodiment of the present invention.

FIG. 8 shows, in a state of disassembly, the frame member 101f, which is formed by assembling a plurality of inner frames 21-30, a plurality of corner parts 53, 55, and a plurality of outer frames 57-60, and 69-80, with said assembly accomplished by using screws.

The inner frames 21-30 are formed to be outline of each plane of the solid shape of the first unit case 101. For example, the inner frames 21 and 22 of the first unit case 101 are formed as sides having two steps each so as to be arranged at two step sides of the first unit case 101. The inner frame 23 is arranged at the front of the first unit case 101, and it has a rectangular shape and openings at positions that align with the external storage modules 104 and 105. The inner frame 29 is arranged at rear of the first unit case 101, where connectors 106 (see FIG. 6) are arranged, and it has an approximately L-shaped outline that corresponds to the back side of said first unit case 101.

The corner parts 53 are arranged at the corners of the solid shape that is formed by the inner frames 21-30, and the corner parts 53 connect the adjacent inner frames 21-30 to one another. The outer frames 57-60, and 69-80 that bridge the corner parts 53 or 55 and are affixed to the outside of the inner frames 21-30. Screws are used for installing the inner frames 21-30, the corner parts 53, and the outer frames 57-60 and 69-80 to one another, whose assembly is described below with reference to the drawings.

Figure 9:
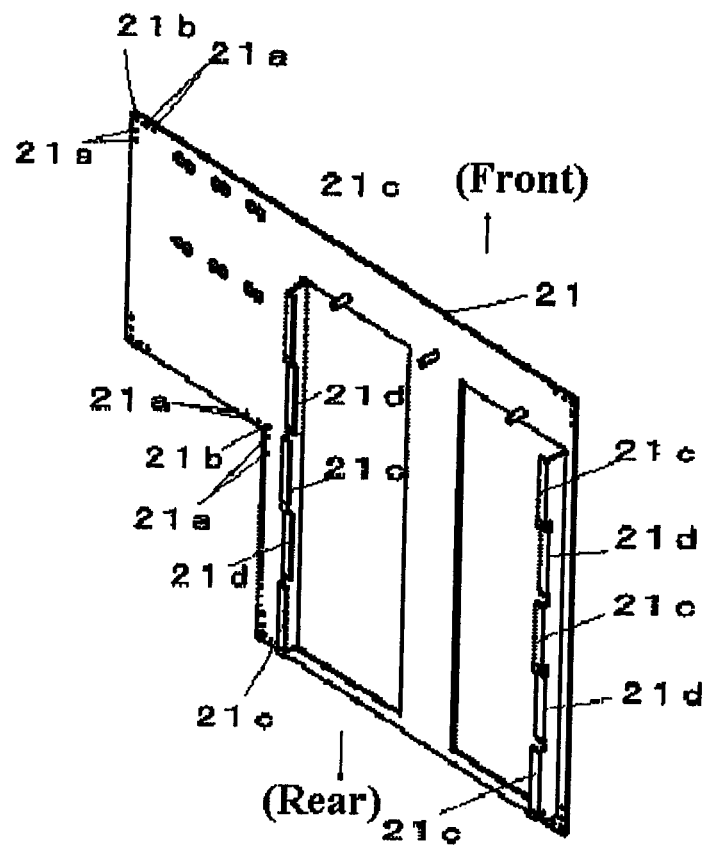
FIG. 9 shows three views of an inner frame of the first unit case that is the first embodiment of the present invention: (a) a perspective view, (b) a side view and (c) an enlarged view of main part.
Figure 9:
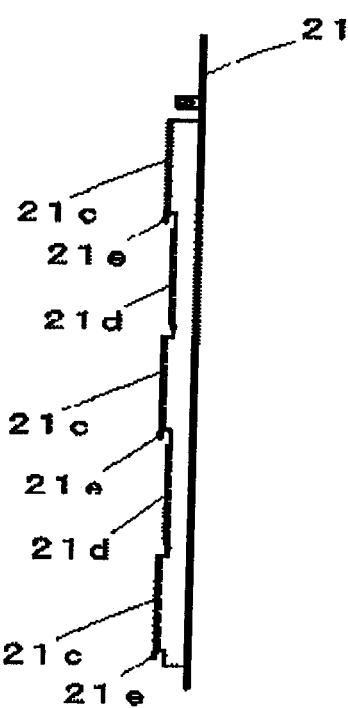
Figure 10:
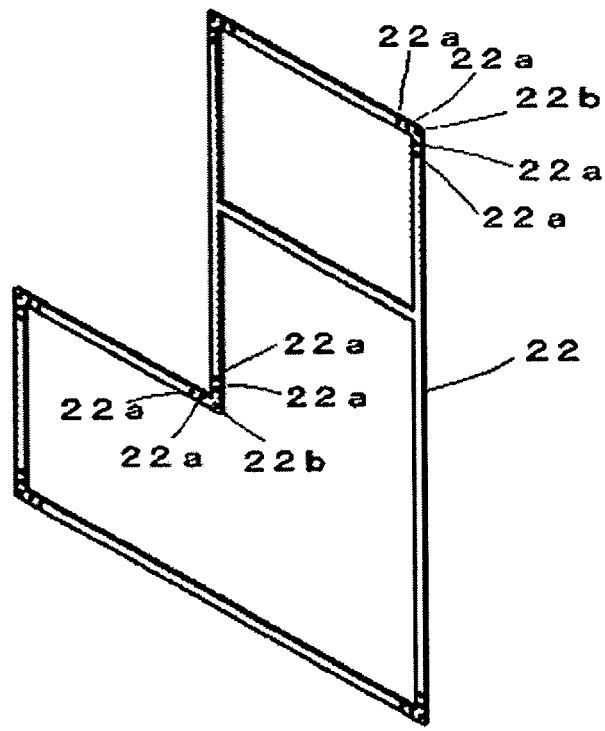
FIG. 10 is a perspective view of the second type of an inner frame of the first unit case that is the first embodiment of the present invention.
Figure 11:
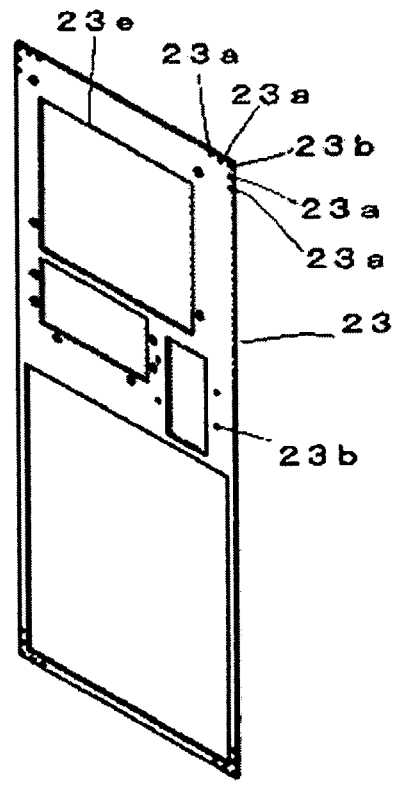
FIG. 11 shows a perspective view of third type of an inner frame of the first case that is the first embodiment of the present invention.

The inner frames 21, 22, and 23 are shown in FIGS. 9 through 11, and are formed in shapes of outline of the planes at the corresponding position to be arranged as described above. Holes 21b, 22b, and 23b at the corners of their respective inner frames 21, 22 and 23 are through-type, and their neighboring holes 21a, 22a, and 23a are tapped-type.

Figure 12:
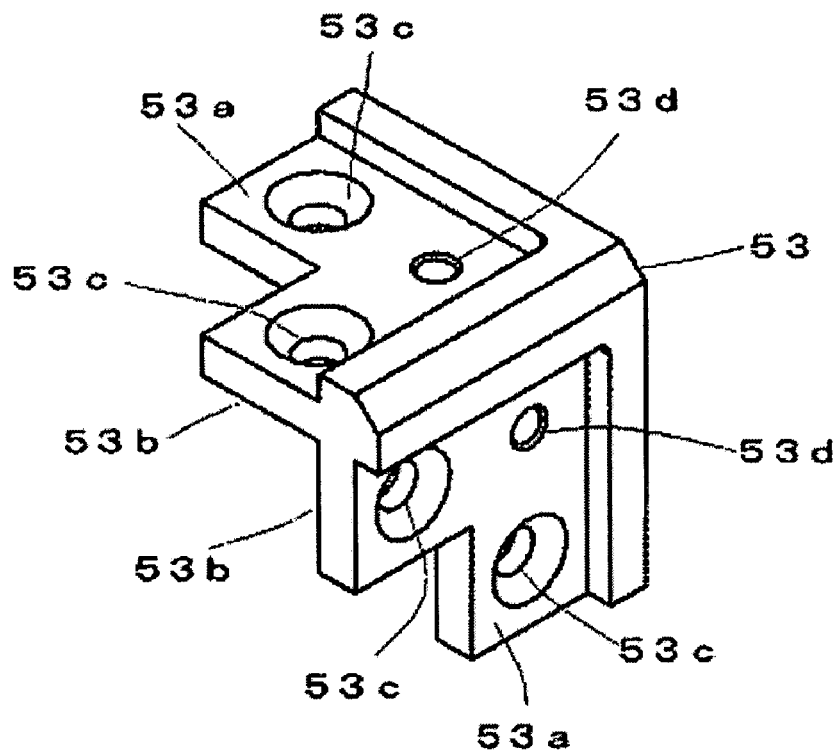
FIG. 12 shows two views of a corner part of the first embodiment of the present invention: (a) a perspective view, and (b) a side view.
Figure 12:
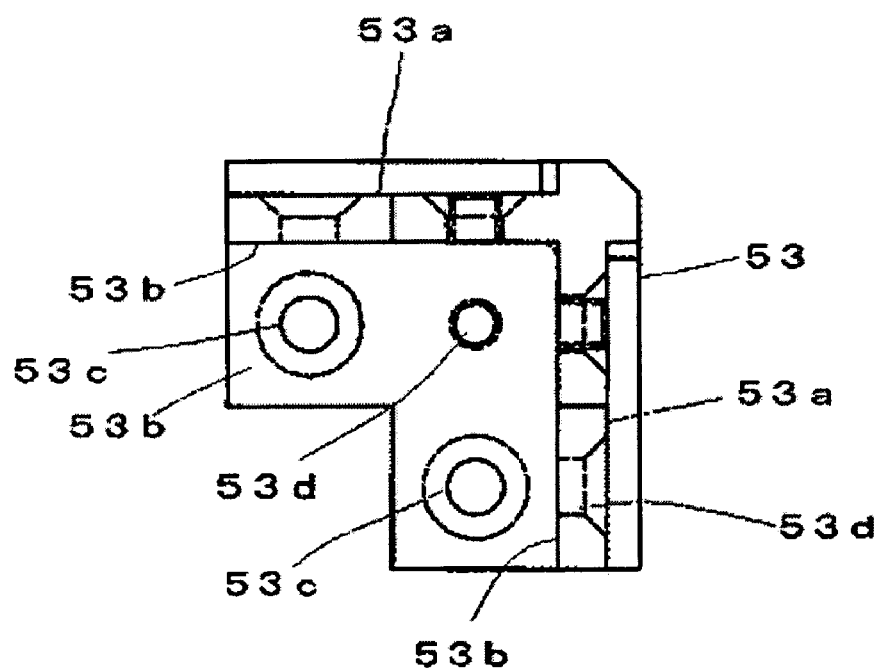

The corner parts 53 have three contact sides that meet at right angles as shown in FIG. 12. The inner frames 21-30 contact inside surfaces 53b of the corner parts 53. Through-type holes 53c are formed on the contact sides of the corner parts 53, and said holes are aligned with the tapped-type holes described above (e.g. 21a-23a of the inner frames 21-23). The adjacent inner frames 21-30 are affixed to one another by inserting screws through the corresponding holes. A tapped-type hole 53d is formed at the corner of the contact side and is used for affixing the outer panels. The outside surfaces 53a contact the outer panels 33, 34, and 36-43, as will be described later.

Figure 13:
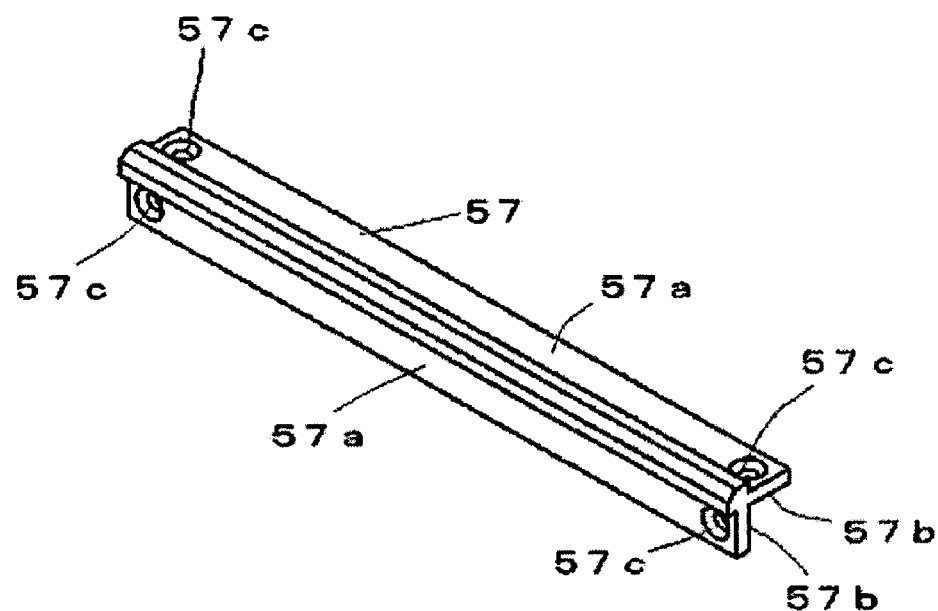
FIG. 13 shows two views of an outer frame of the first embodiment of the present invention: (a) a perspective view, and (b) a side view.
Figure 13:
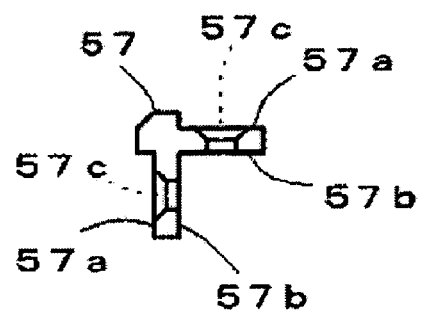

FIG. 13 shows an outer frame 57, whose length corresponds to the position where it is to be affixed to the inner frame 23, and at whose ends in the longitudinal direction are through-type holes 57c for screws to penetrate. Corner parts 53 are located at both ends of the outer frame 57. Thus, the outer frame 57 is affixed to the outside of the inner frame 23 by being flanked by the corner parts 53. Through-type holes 57c described above are aligned with the remaining tapped-type holes 23a of the inner frame 23 (FIG. 11) so that the outer frame 57 can be affixed to the inner frame 23 by inserting screws through the holes.

The other outer frames 58-60 and 69-80 have the same structure as the frame member 57, and they are affixed to the outsides of the corresponding inner frames 21-30.

The first unit case 101 contains external storage modules 104, 105, and therefore installation panels 45, 46, and 64 (in FIG. 8) are provided for installing said moludes. The installation panels 45 and 46 are formed in the shape of a "U" and are attached to the corresponding inner frames by using screws or hooks so that the lower external storage modules 105 are affixed to the installation panel 45 and the upper external storage module 104 are affixed to the installation panel 46.

Figure 14:
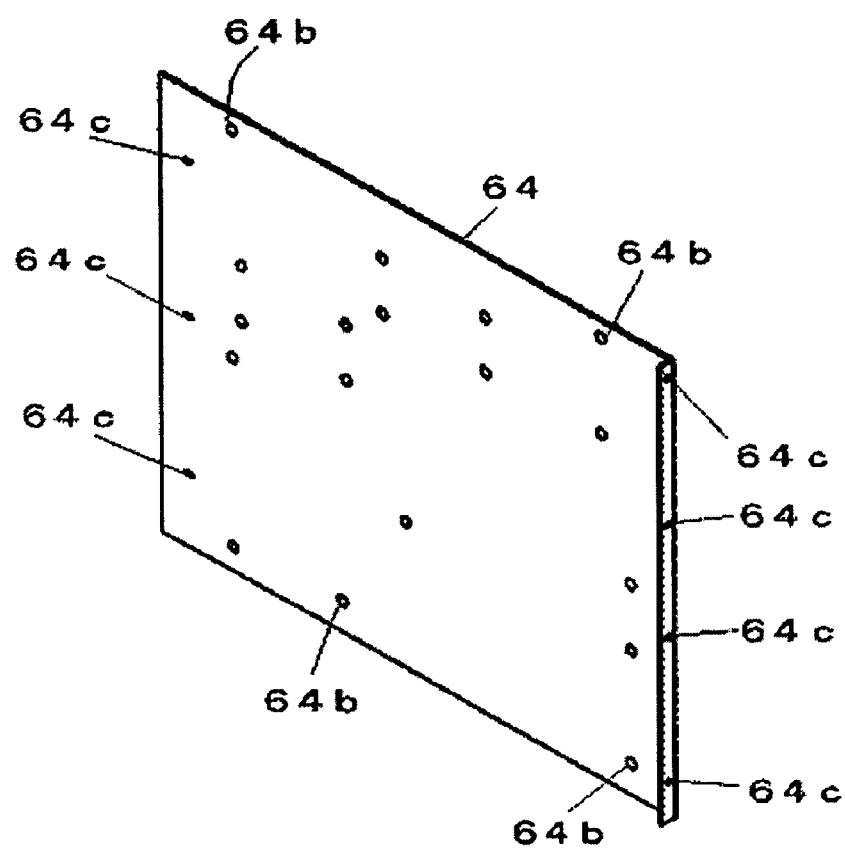
FIG. 14 shows two views of an installing panel of the first embodiment of the present invention, (a) a perspective view, and (b) a side view.
Figure 14:
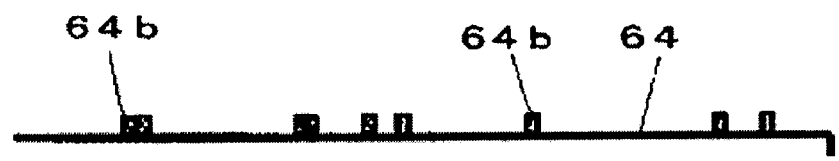

The installation panel 64 is a PC board base onto which a board (such as a. motherboard) is affixed, and is attached to the inner frame 21 after the board is affixed. The installation panel 64 has convex-shaped female-screw supports 64b, as shown in FIG. 14, that are formed on the inner frame 21 side and that receive male screws so as to screw a board (such as a motherboard) onto said installation panel 64. Therefore, the inner frame 21 of this embodiment serves as an installation panel. For this purpose, on the inner frame 21, as shown in FIG. 9, guides 21c and 21d, which are alternately arranged in the vertical direction, are arranged in both right side and left side. The guides 21c and 21d have different heights and their edges are bent. The installation panel 64 is inserted from rear of the inner frame 21 (rear of the first unit case 101) through the space between the back plane of the edge of the upper guide 21c and the surface of the lower guide 21d, and said installation panel 64 is finally affixed to the inner frame 21 by using screws. Bent guides 21e are arranged at the rear tip of guides 21c for making it easy to insert the installation panel 64.

Figure 15:
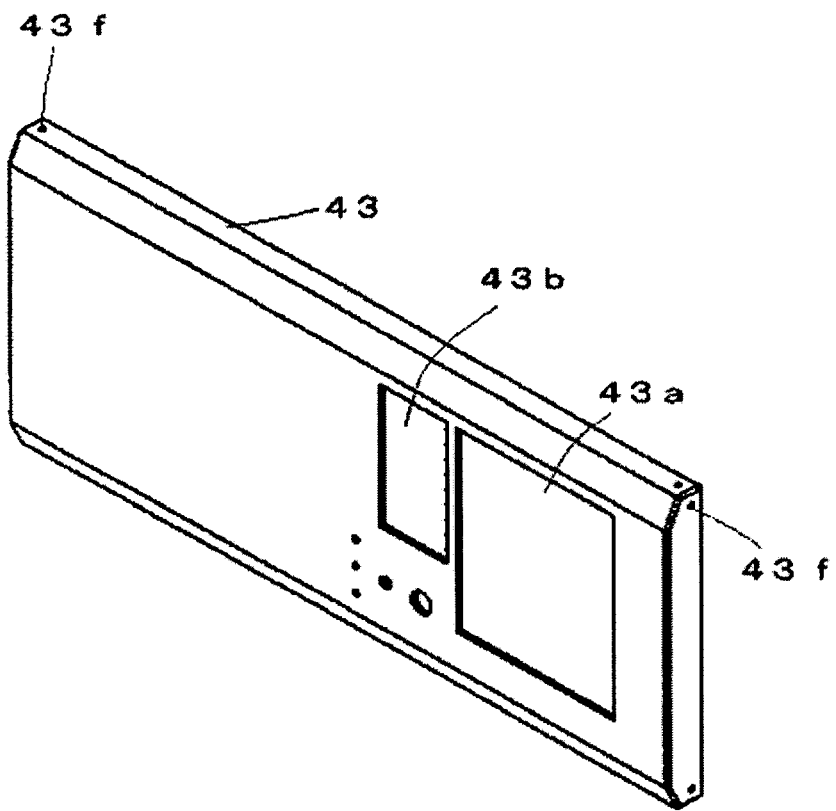
FIG. 15 shows two views of an outer panel serving as the front cover of the first embodiment of the present invention: (a) a perspective view, and (b) a side view.
Figure 15:
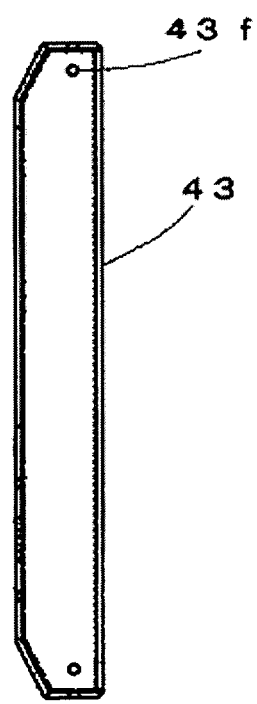
Figure 16:
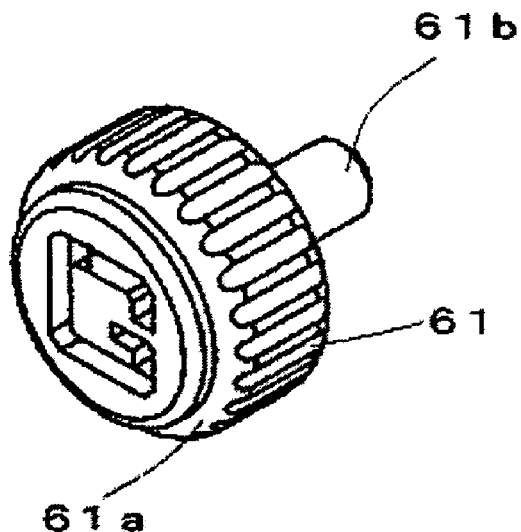
FIG. 16 shows two views of an decorative screw of the first embodiment of the present invention: (a) a perspective view, and (b) a side view.
Figure 16:
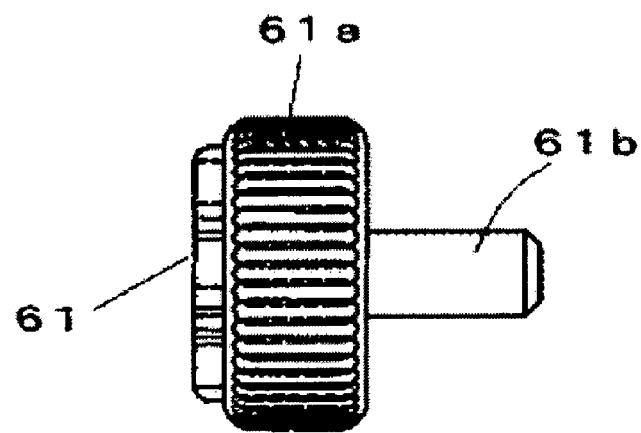

The outer panels 33, 34, and 36-43 are affixed to outside of the frame member 101f as shown in FIG. 7. The outer panels 33, 34, and 36-43 are affixed to the outside of the outer frames 57-60, 69-80, and the corner parts 53, and through-holes are formed for decorative screws 61, as shown in FIG. 16, to penetrate. The through-holes 43f are formed so as to face to the tapped holes 53d of the corresponding corner parts 53, when the outer panels 33, 34, and 36-43 are to be affixed to the frame member 101f, and shown in FIG. 15, through-holes 43f are formed at the four corners of the outer panel 43 that serves as the front cover.

The decorative screws 61, whose heads 61a are processed so as to have an uneven surface so as to prevent their slipping, are used for affixing the outer panels via a screw part 61b that extends from the head 61a. The outer panels 33, 34, and 36-43 can easily be affixed by arranging the outer panels to contact the outsides of their corresponding outer frames, then inserting the decorative screws 61 into the through-holes and into the tapped holes 53d of the corner parts 53.

The first unit case 101 has a structure such that the frame member 101f, which is outline of the solid shape of the first unit case 101, is formed by assembling the inner frames, the corner parts, and the outer frames, then the outer panels are attached to the outside of the frame member 101*f* by screws. Therefore a user can easily assemble and disassemble the first unit case 101.

Figure 17:
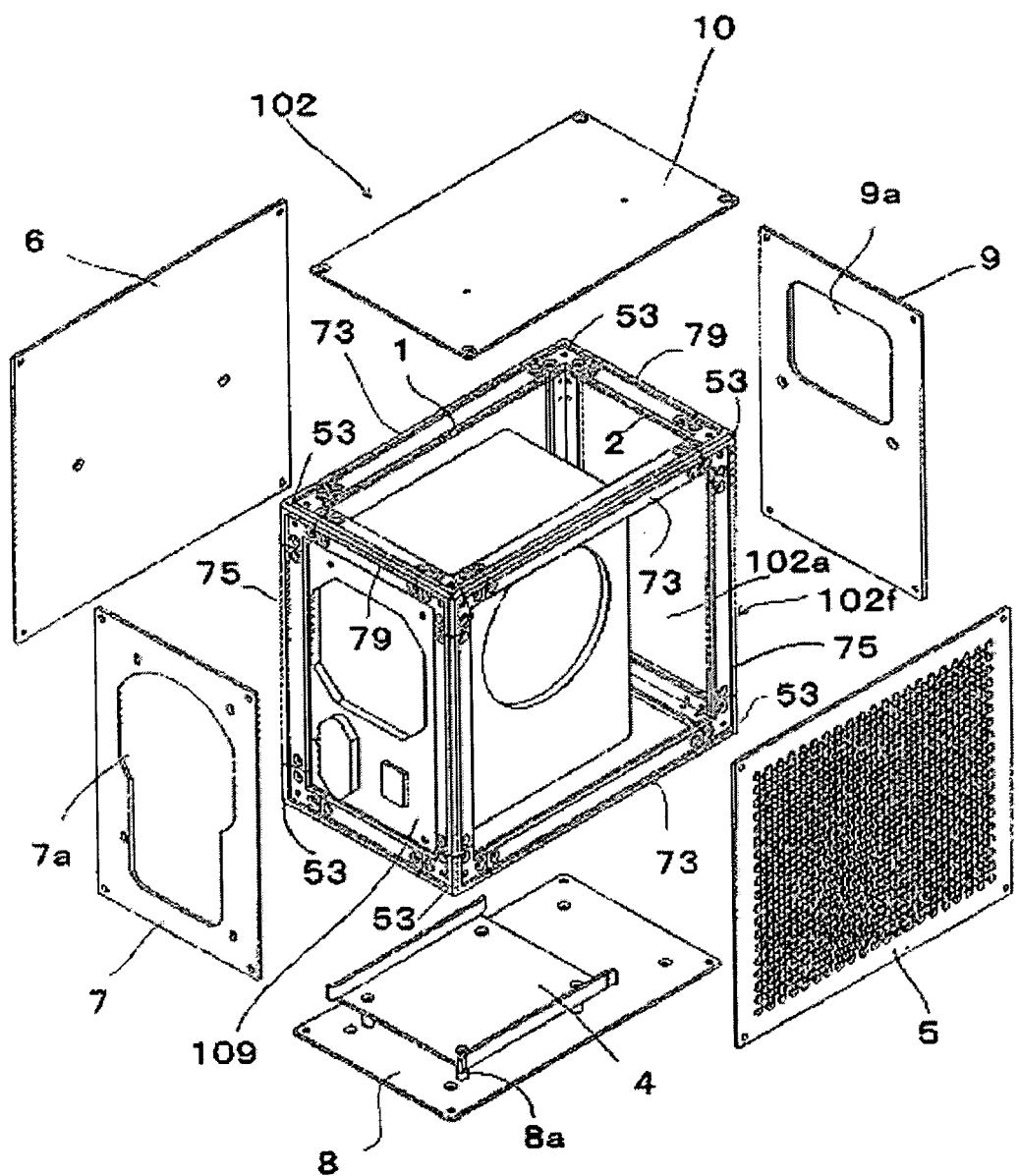
FIG. 17 is a perspective view of a disassembled second unit case of the first embodiment of the present invention.

FIG. 17 shows a disassembled second unit case 102 that houses a power module 109. Six outer panels 5-10 are affixed to outside of a frame member 102*f*. A power component bay 102*a*, for housing the power module 109, is formed in the second unit case 102. An installation panel 4 is affixed onto the lower outer panel 8 so that the power module 109 can be affixed on top of the installation panel 4 by using screws. In this embodiment, the power module 109 is a rectangular parallelepiped, and therefore the frame member 102*f* is formed in such a manner that the power component bay 102*a* also is a rectangular parallelepiped.

Figure 18:
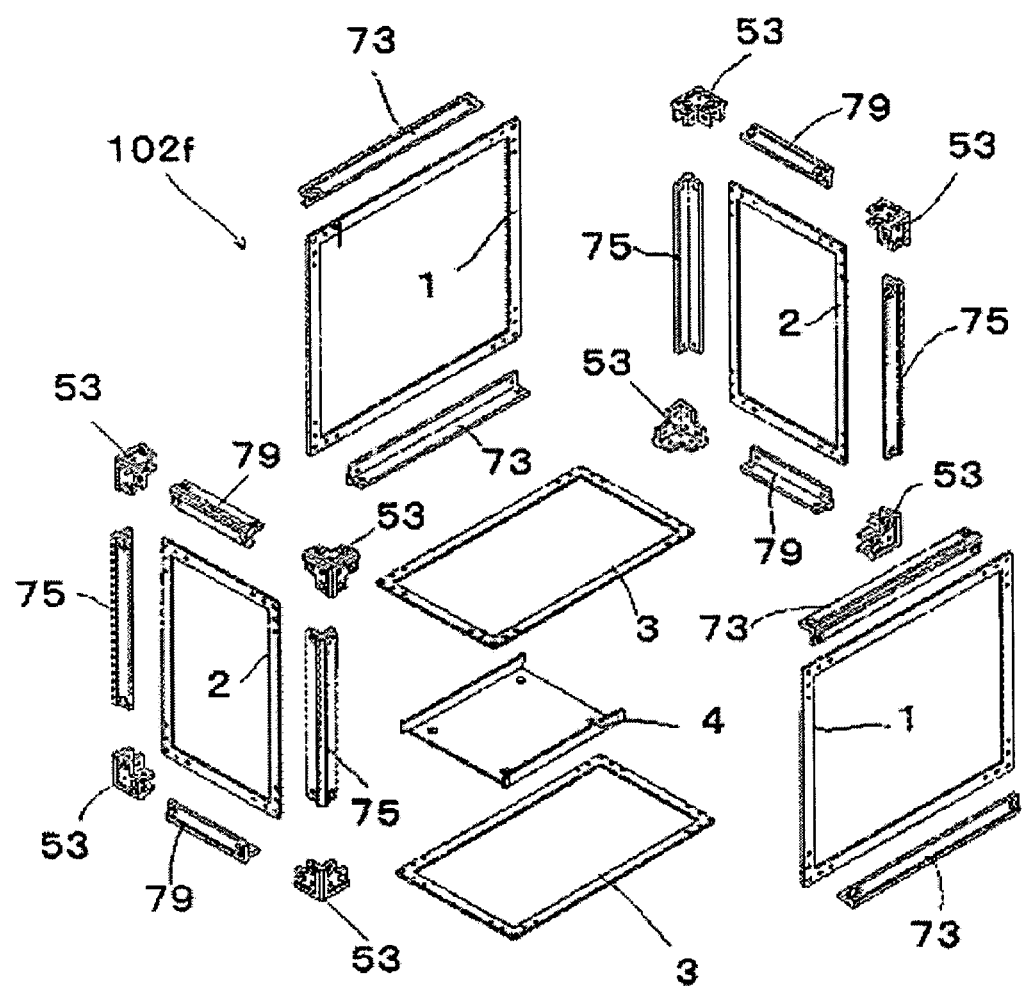
FIG. 18 is a perspective view of a disassembled frame member of the second unit case that is the first embodiment of the present invention.

FIG. 18 shows the frame member 102*f* of the second unit case 102 in a disassembled state. The frame member 102*f* comprises (1) six rectangular inner frames—two each of 1, 2, and 3—each of which forms one side of rectangular parallelepiped, (2) a plurality of corner parts 53 for connecting adjacent inner frames (inner frames 1 and 2, for example) to one another at the corners of the inner frames, and (3) a plurality of outer frames 73, 75, and 79, which are affixed to the outside of the inner frames 1, 2, and 3.

The structure of the frame member 102*f* concerning assembly of the inner frames, the corner parts, and the outer frames is the same as that of the frame member 101*f*. Therefore, assembly and disassembly of the inner frames, the corner parts, and the frame member is done easily by using screws The second unit case 102, whose exterior is a rectangular parallelepiped, is formed in such a manner that the outer panels 5-10 are affixed to the outside of the frame member 102*f*. Decorative screws 61 are used to affix the outer panels 5-10 to the second unit case 102, in the same way as the first unit case 101.

Figure 19:
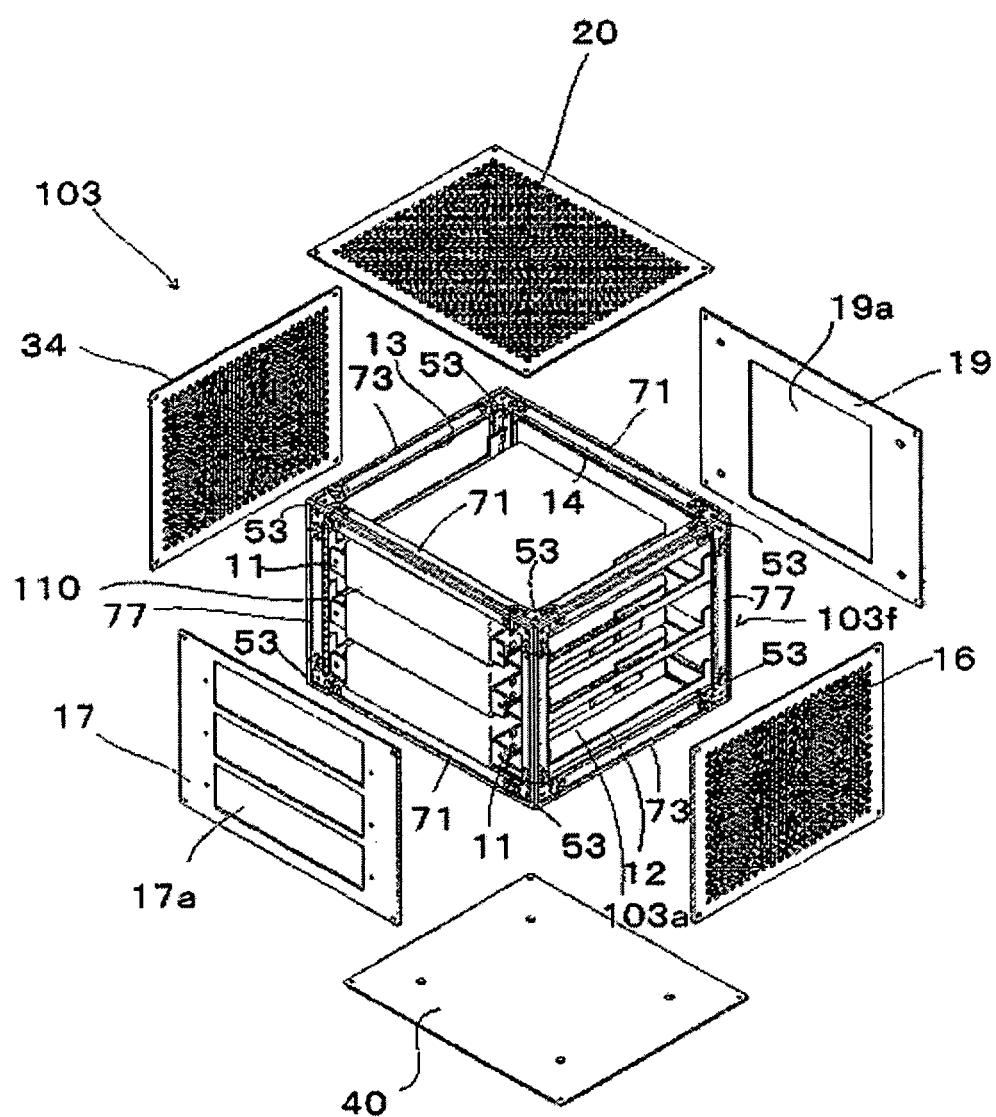
FIG. 19 is a perspective view of a disassembled third unit case of the first embodiment of the present invention.

FIG. 19 shows a disassembled third unit case 103. The third unit case 103 is formed by installing six outer panels 16, 17, 19, 20, 34, and 40 on the outside of an frame member 103*f*. The third unit case 103 includes a internal storage modules bay 103*a* for housing internal storage modules.

Figure 20:
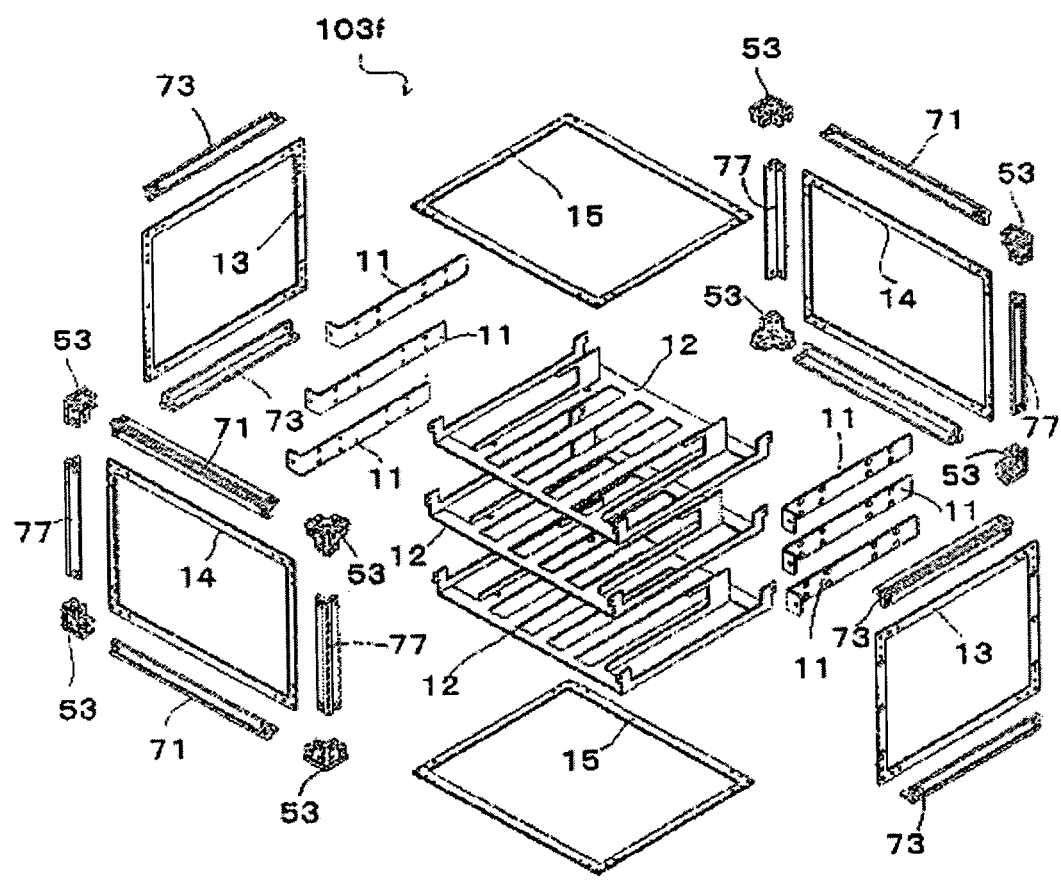
FIG. 20 is a perspective view of a disassembled frame member of the third unit case that is the first embodiment of the present invention.

In the internal storage modules bay 103*a*, for instance, three internal storage modules 110, such as hard disk drives, can be vertically installed. For that purpose, three installation panels 12 (See FIG. 20) are affixed inside the frame member 103*f* by using screws. As shown in FIG. 20, a fixing panel (an installation panel) 11 is provided to each installation panel 12 so as to affix the internal storage module 110 by using screws. In this embodiment, the internal storage module 110 is a rectangular parallelepiped, and thus the frame member 103*f* is formed so that the internal storage module bay 103*a* also will be a rectangular parallelepiped.

FIG. 20 shows the frame member 103*f* of the third unit case 103 in a disassembled state.

The third unit case 103 comprises (1) six rectangular inner frames—two each of 13, 14, and 15—each of which forms one side of rectangular parallelepiped, (2) a plurality of corner parts 53 for connecting adjacent inner frames (inner frames 1 and 2, for example) to on another at the corners of the inner frames, and (3) a plurality of outer frames 71, 73, and 77, which are affixed to the outside of the inner frames 13, 14, and 15. The structure of the frame member 103*f* concerning assembly of the inner frames, the corner parts, and the outer frames is also the same as that of the frame member 101*f*. Therefore, assembly and disassembly of the inner frames, the corner parts, and the frame member is done easily by using screws.

The third unit case 103, which has a rectangular-parallelepiped shape, can be formed by affixing the outer panels 16, 17, 19, 20, 34, and 40 on the outside of the frame member 103*f*. Decorative screws 61 are used to affix the outer panels 16, 17, 19, 20, 34, and 40 to the third unit case 103, in the same way as the first unit case 101.

The first unit case 101, the second unit case 102, and the third unit case 103 described above can be formed by using screws to assemble together inner frames, corner parts, and outer frames, thus first forming frame members, to the outside of which outer panels can be mounted, thereby forming said unit cases 101, 102, and 103, which are easy to assemble and disassemble.

Therefore, a user can freely and enjoyably select and change the design of his or her case for computer by selecting appropriate parts of frame members and then outer panels thereon. When adding an additional module, both the parts of the frame member and the outer panels to be mounted thereon can be selected so as to fit the shape and size of the additional module, so that such additional module can easily be assembled together in a case for computer, avoiding a messy desktop. Further, because the case can easily be disassembled, a bulky package is not needed to transport the computer, which facilitates transportation.

Figure 21:
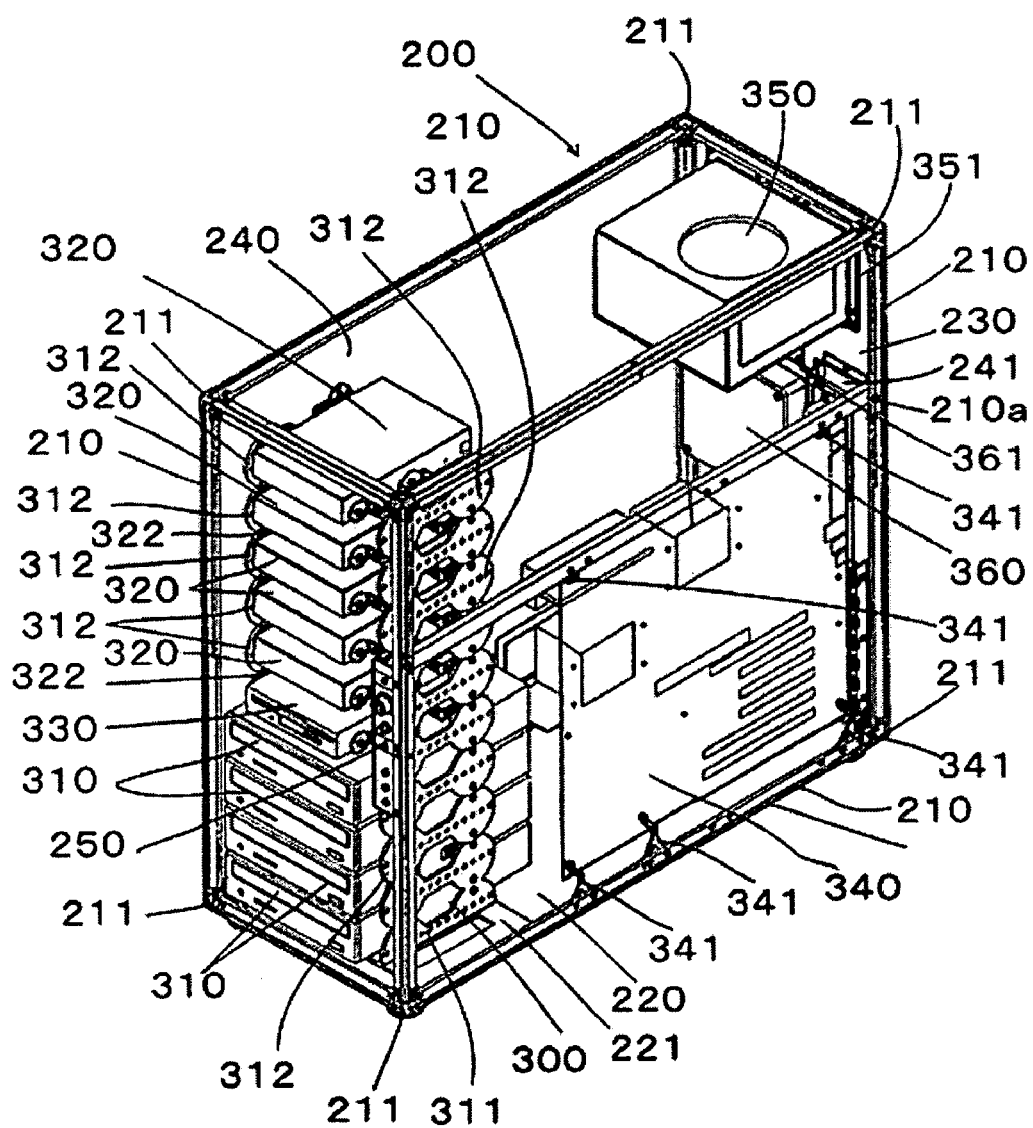
FIG. 21 is a perspective view from the front of a case for computer that has its front panel removed and that is a second embodiment of the present invention.
Figure 22:
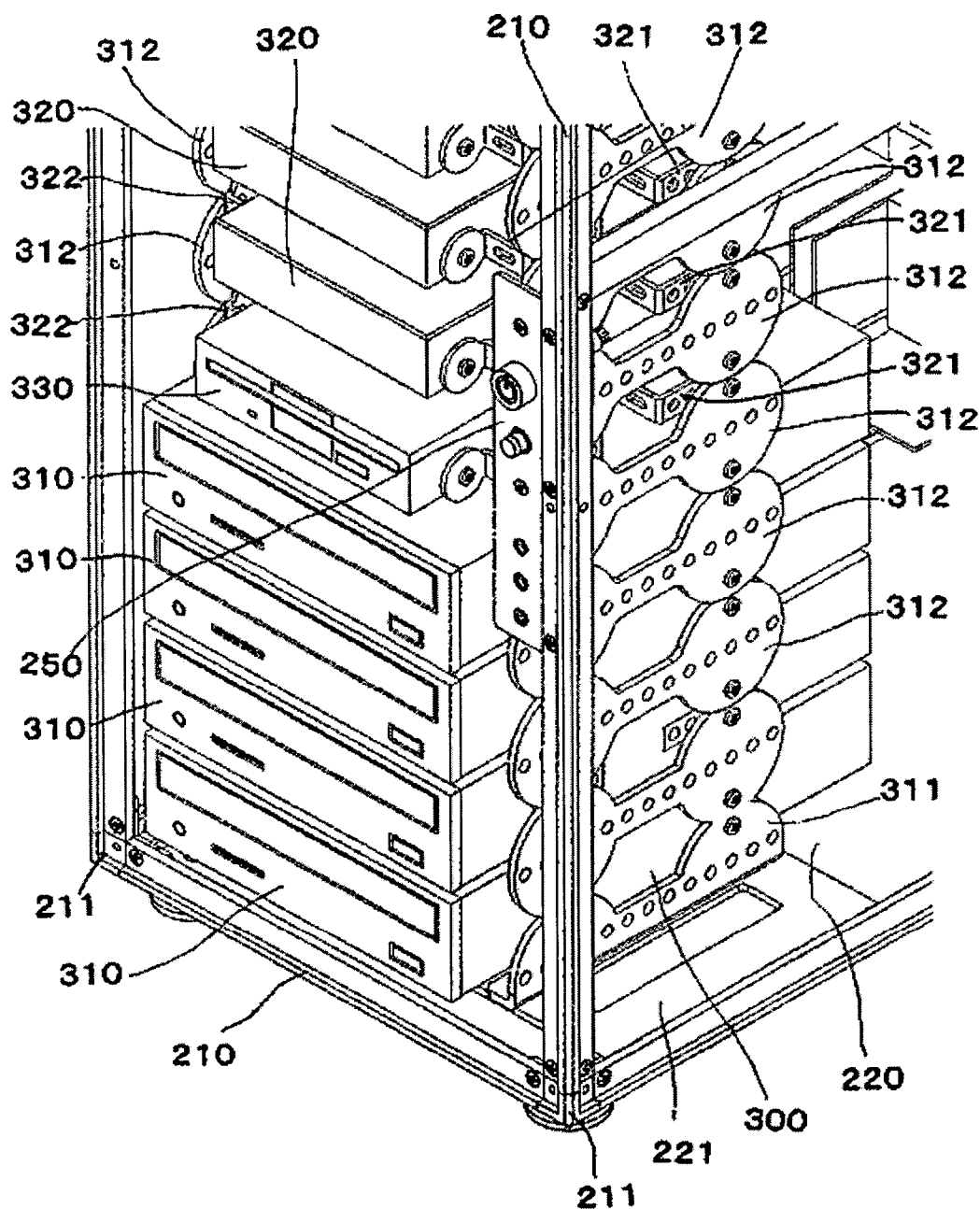
FIG. 22 is an enlarged view of main part in FIG. 21.
Figure 23:
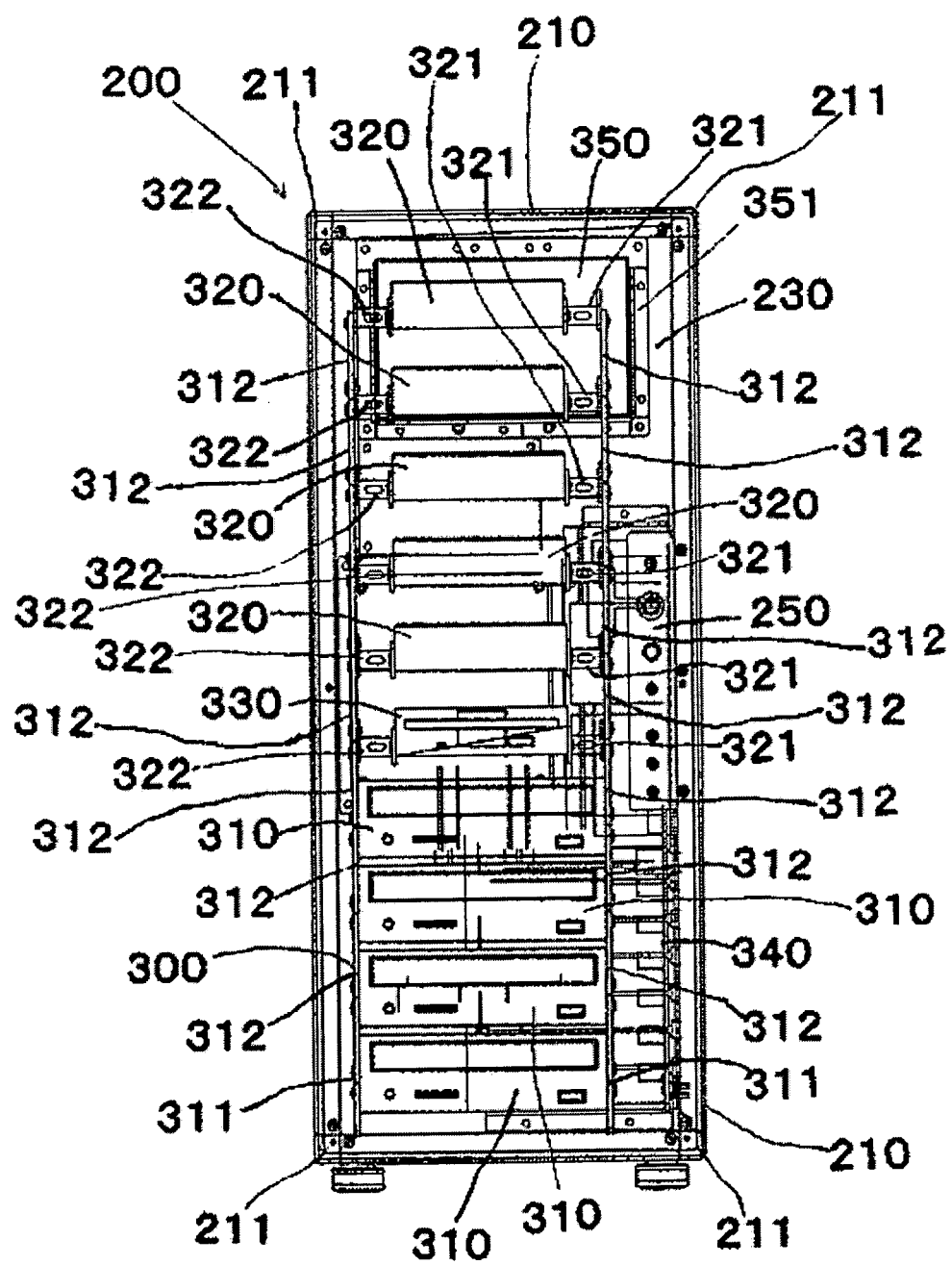
FIG. 23 is a front view of the case for computer shown in FIG. 21.

Next, a second embodiment of the present invention shows its application to a full-tower-type computer, and in the second embodiment, shown in FIGS. 21-23, a case 200 comprises of a case for computer by itself. In the description that follows, the directions of left and right refer to the left and right sides of the case, as viewed from the front of the case.

FIG. 21 is a perspective view of the case for computer 200 from the front side, showing the case with the outer panels partly removed. FIG. 22 is an enlarged view of the main part of the case (the disk-drive bay), and FIG. 23 is a front view of the case.

The case 200 houses large external storage modules such as 5-inch disk drives 310, small internal/external storage modules such as 3.5-inch disk drives 330 and 320, a motherboard bay 440 that contains boards including the motherboard, and other devices (not all shown) for PC, as shown in FIG. 21. The case 200 also houses the power module 350 and fan module 360.

At the front of the case 200, a SW-LED panel 250 is arranged in such a manner that switches, such as a main switch to start the computer and a reset button to restart it, and indicators such as a power indicator and access lamps are properly arranged. Also, at the rear of the case 200, a rear connector panel 241 is arranged in such a manner that connectors that can be connected with a power supply, a display, a scanner, other computers, and electronic devices for communication and the like, are arranged.

The case 200 comprises a frame member 210 and a plurality of outer panels affixed on the outside of the frame member 210 so as to cover them. FIG. 21 shows, as outer panels, a bottom panel 220, a rear panel 230, and a left-side panel 240, with other outer panels, such as front panel, right-side panel, and top panel, removed.

The frame member 210 is formed to be outline (outer shell) of a solid shape of the case 200. The case 200 becomes a rectangular parallelepiped when a plurality of outer panels 220, 230, 240 and others are affixed to the outside of the frame member 210, as shown in FIG. 21.

The frame member 210 is formed by using screws to assemble together a plurality of outer frames and a plurality of corner parts 211. In this embodiment, the frame member 210 is easily formed so as to directly connect a plurality of the outer frames with the corner parts by using screws (i.e. inner frames of the first embodiment are omitted in this embodiment), resulting in easy disassembly.

The outer frames form outline of the sides of solid shape of the case 210. Each of the outer frames has a quasi-angular shape similar to that of the outer frame 57 of the first embodiment that is shown in FIG. 13, for instance.

The corner parts 211 are located at the corners of the solid shape formed by the outer frames, and said corner parts 211 connect adjacent outer frames to one another. Only screws are used to attach the corner parts 211 and the outer frames to one another. The structure will now be described with reference to the drawings.

Both ends of the outer frames have through-holes (which correspond to holes 57*c* in FIG. 13, for instance).

Figure 28:
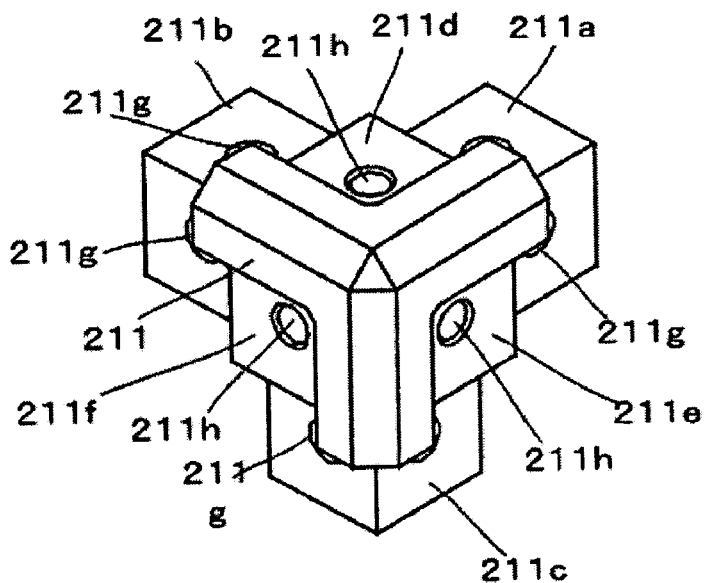
FIG. 28 shows two views of a corner part used in the second embodiment of the present invention: (a) a perspective view from outside, and (b) a perspective view from behind.
Figure 28:
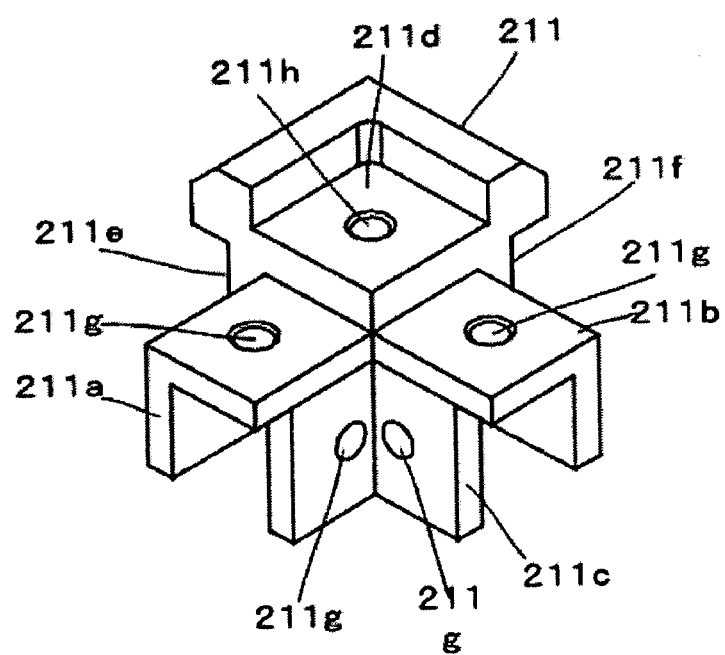

FIG. 28 shows two views of a corner part of this embodiment: (a) is a perspective view from the outside, and (b) is a perspective view from the inside.

The corner part 211 has contact faces that have three orthogonal steps, as shown in FIG. 28 (*a*). The contact faces having such steps are formed in such a manner that the upper contact faces 211*d*, 211*e*, and 211*f*, which are the upper steps on the side of an orthogonal meeting point (mounting part), are respectively followed by lower contact faces 211*a*, 211*b*, and 211*c*, which also have an angular shape. The lower contact faces contact the inside planes of the outer frame (57*b* in FIG. 13, for instance). Each of the angle planes of the lower contact faces 211*a*, 211*b*, and 211*c* has a tapped hole with which the through-holes (57*c* in FIG. 13, for instance) of the outer frames described above are aligned, and through which screws are inserted so as to affix the adjacent outer frames to the corner parts 211.

The upper contact faces 211*d*, 211*e*, and 211*f* contact the outer panels 220, 230, 240 and other outer panels. Each of the upper contact faces 211*d*, 211*e*, and 211*f* has tapped hole(s) 211*h*, which are used to affix the outer panels. (See FIG. 22).

Each of the outer frames has a length that corresponds to outline of each side of the solid shape of the case 210. Other outer frames have the same structure as the aforementioned outer frame has and each is connected with the corresponding corner parts 211.

As shown in FIG. 21, the case 200 houses a disk-drive bay 300, in which a plurality of large/small disk drives 310, 320, and 330 are installed as internal/external storage modules in a stacked, united form. In this respect, the structure differs from that of both a conventional personal computer and that of the first embodiment, in which the internal storage modules bay for such as hard disk drives are housed separately from the large/small external storage modules bay. Therefore, the disk-drive bay 300 offers greater space economy than a conventional internal/external storage modules bay does.

As shown in FIGS. 21-23, the disk-drive bay 300 comprises:

(1) a pair of left-side and right-side first angle panels 311, 311 that (a) are arranged across two vertically stacked large disk drives 310, 310 and sustain the two drives from their respective sides, and (b) affixed to top face of a bay-fixing panel 221 that is affixed to an outer frame that forms bottom plane of the case 200, (2) a plurality pairs of (in FIGS. 21-23, three pairs of) left-side and right-side second angle panels (312, 312), -, (312, 312) that (a) are sequentially arranged across adjacent two (310, 310) of a plurality of (in FIGS. 21-23, two) vertically stacked large disk drives 310, 310 that are placed on the aforementioned upper large hard disk drive (310), and (b) sustain the two adjacent drives from their respective sides, and (3) left-side and right-side third angle panels 322 and 321 that (a) sustain a small disk drive 330 that is stacked atop the uppermost large disk drive 310 from its respective sides, and (b) are affixed respectively to the left-side and right-side second angle panels 312, 312 that are arranged at the uppermost large disk drive (310), and wherein (4) a plurality of second angle panels (312, 312), -, (312, 312) that have the same shape as the aforementioned second angle panels, can be installed consecutively (1) by being arranged across vertically adjacent two ((322, 322) and (321, 321)) of a plurality of third left-side and right-side third angle panels (322, 321)-(322, 321) that have the same shape as the aforementioned third angle panels, and that sustain one by one a plurality of (In FIGS. 21-23, five) small disk drives 320, 320, -, 320 that are stacked successively on the aforementioned small disk drive from their respective sides, and (2) by fixing the two adjacent third angle panels (5) a plurality of the large and small disk drives 310, 330, 320 are stacked, through (a) the pair of the left-side and right-side first panels 311, 311, (b) the plurality pairs of the second, left-side and right-side panels (312, 312), -, (312, 312), and (c) the left-side and right-side third angle panels (322, 321), -, (322, 321), being affixed to the panels by using screws, so that the case is easy to disassemble. Therefore, a user can freely and enjoyably select a case for computer design such that additional components (modules) such as an additional disk drive can be easily housed in the case, thereby avoiding a messy desktop. Said first, second, and third left and right angle panels are made so as to be compact and lightweight, so that the entire case for computer will be more compact and lightweight than traditional cases are (details regarding this are presented below).

Figure 29:
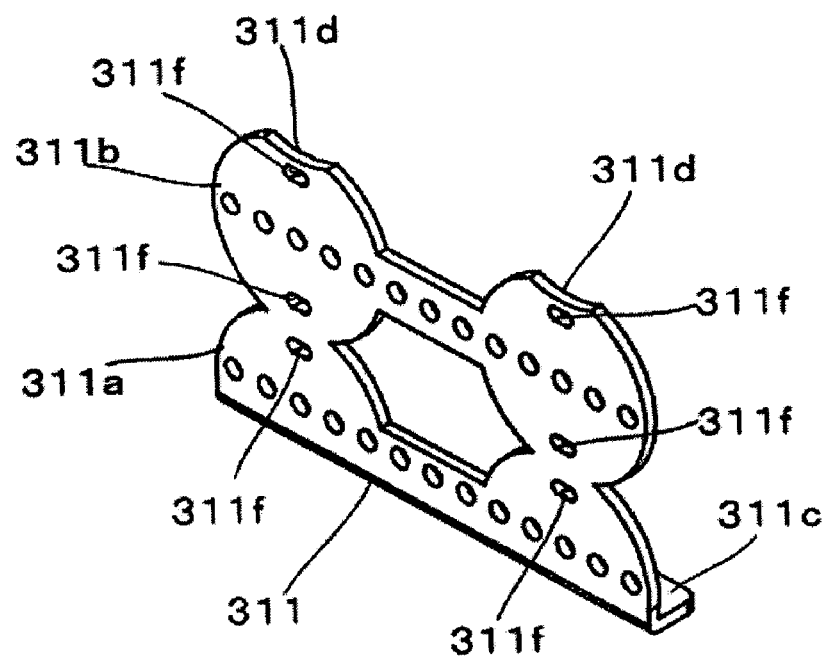
FIG. 29 shows two views of a first angle panel of the second embodiment of the present invention: (a) a perspective view from the front, and (b) a plan view from above.
Figure 29:
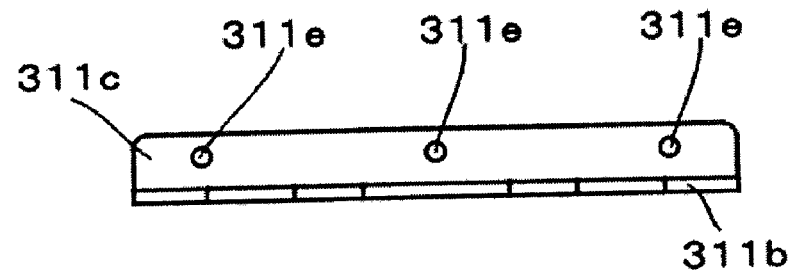

FIG. 29 shows two views of the first angle panel 311 of this embodiment: (a) a perspective view from the front, and (b) a plan view from above. The first angle panel 311 is a thin panel that has an L-shaped cross section formed by flex molding. Said first angle panel 311 has (1) a fixing flange 311*c* that is to be affixed, by using screws, to the top surface of the bay-fixing panel 221, and (2) flat installing portions 311*a*, 311*b* that extend from the fixing flange 311*c* in the shape of an L, and that are to be affixed, by using screws, to the sides of and across two large disk drives 310, 310 that are stacked one upon the other.

As shown in FIG. 29(*b*) for instance, the fixing flange 311*c* is provided with three through-holes 311*e*, 311*e*, 311*e*, through which screws are inserted to affix the fixing flange 311*c* to the top surface of the bay fixing panel 221. The through-hole 311*e* could instead be a tapped hole.

The flat installing portions 311*a*, 311*b* are provided, respectively, with two and four (2 holes by 2 rows) long through-holes 311*f*, 311*f*, -, 311*f*, 311*f*. The two long holes 311*f*, 311*f* of the flat installing portion 311*a* and two lower long holes 311*f*, 311*f* of the flat installing portion 311*b* are holes through which screws are inserted into the sides of the lowest large disk drive 310, and two higher long holes 311*f*, 311*f* are holes through which screws are inserted into the sides of the second lowest large disk drive 310 (See FIG. 22).

The flat installing portions 311*a* and 311*b* have a plurality of holes (numerals omitted) of proper size in their center and periphery, so as to make said installing portions 311*a* and 311*b* lightweight and able to provide the disk drives with good radiation of heat.

Figure 30:
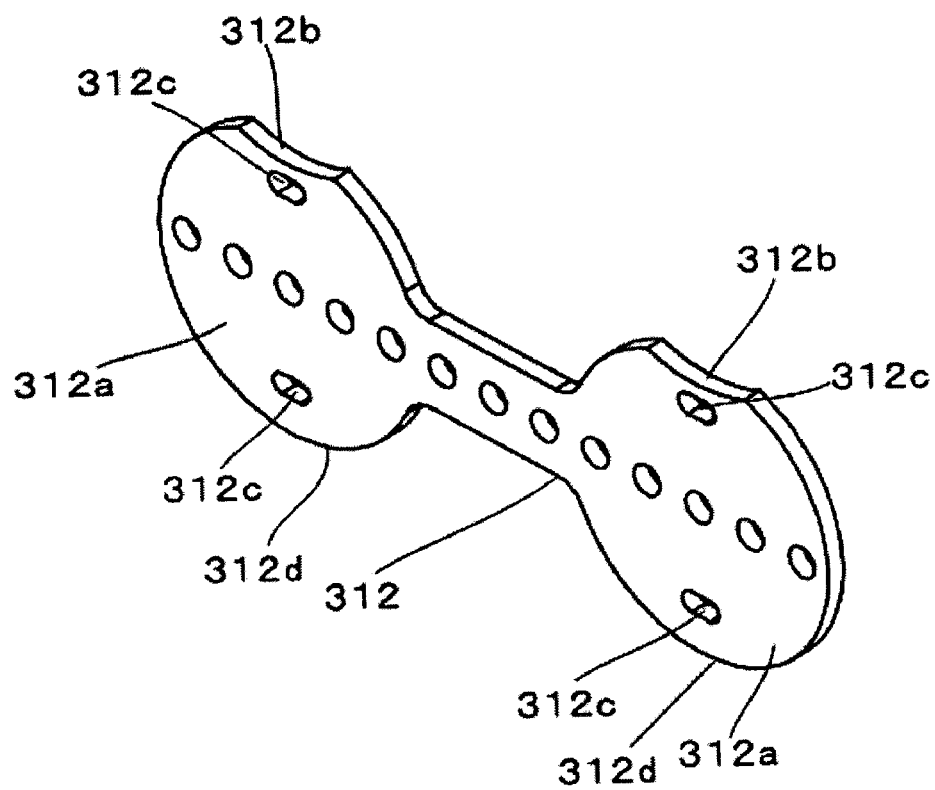
FIG. 30 is a perspective view of a second angle panel of the second embodiment of the present invention.

FIG. 30 is a perspective view from the front of the second angle panel 312 of this embodiment.

The second angle panel 312 is flat and thin, and it has a plurality of holes (numerals omitted) of a proper size in line along its the center longitudinally, so as to make said second angle panel 312 lightweight and able to provide the disk drives with good radiation of heat.

The second angle panel 312 has a flat installing portion 312a that is attached, by using screws, to the sides of and across two stacked large disk drives 310, 310. The flat installing portion 312a is provided with four long through-holes (2 holes by 2 rows) 312c, 312c, 312c, 312c. Two lower long holes 312c, 312c of the flat installing portion 312a are holes through which screws are inserted into the higher tapped holes in the sides of the second lowest large disk drive 310, while the upper long holes 312c, 312c of the flat installing portion 312a are holes through which screws are inserted into the lower tapped holes in the sides of the third lowest large disk drive 310. Therefore, a plurality of pairs of the second angle panels (312, 312), -, (312, 312) allows fourth lowest or more large disk drives 310, 310, -310 to be stacked successively (See FIGS. 22 and 23).

Figure 31:
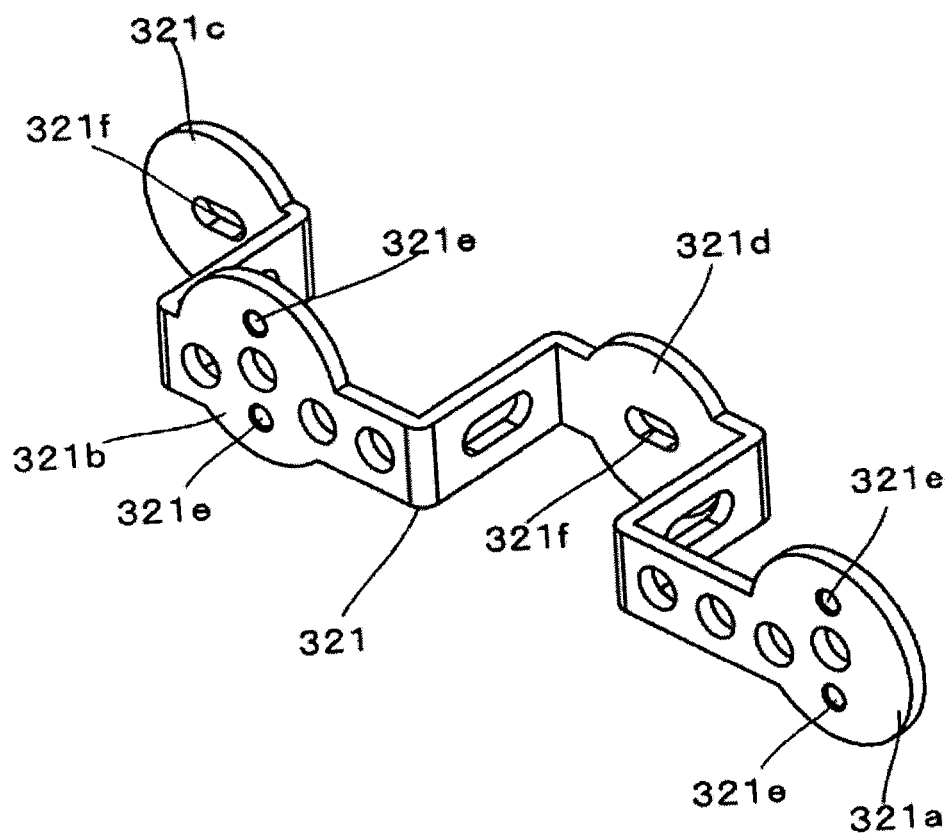
FIG. 31 is a perspective view of a third right angle panel of the second embodiment of the present invention.
Figure 32:
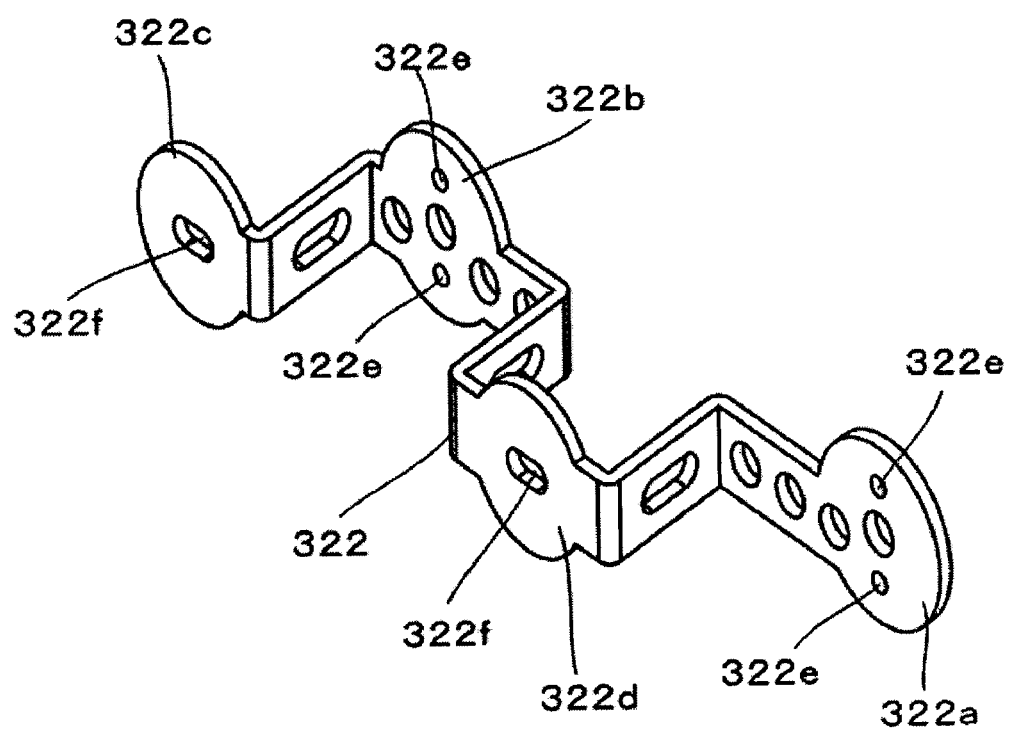
FIG. 32 is a perspective view of a third left angle panel of the second embodiment of the present invention.

FIG. 31 is a perspective view of a third right angle panel 321 from the front of said panel, and FIG. 32 is a perspective view of said third left angle panel 322 from the rear (inside) of said panel.

A third angle panel 321 or 322 is thin and has holes (numerals omitted) of a proper size, so as to make said third angle panel lightweight and able to provide the disk drive with good radiation of heat.

The third right angle panel 321, as shown in FIG. 31, has (1) flat installing portions 321c, 321d for affixing said panel 321 to the right side of the small disk drive 330 that is stacked above the uppermost of the large disk drive (310), and (2) fixed parts 321b, 321a, which are formed in the shape of a crank and that extend outwards to the right from said flat installing portions 321c, 321d for use in affixing, by using screws, said right angle panel 321 to the flat installing portion 312a of the second angle panel 312 that is arranged on the right side of the uppermost large disk drive (310).

Both of the flat installing portions 321c and 321d are provided with one long through-hole 321f, 321f (two long through-holes in total), which are holes through which screws are inserted into the right side tapped holes of a small disk drive 330 or 320.

Both of the fixed parts 321b, 321a are provided with two long tapped holes 321e, one below and one above the longitudinal centerline of said right angle panel 321—i.e., a total of four tapped holes 321e, 321e, 321e, 321e (two holes by two rows)—through which screws are inserted into the flat installing portions 312a, 312a of the two vertically arranged right-side second angle panels 312, 312.

Screws are inserted through the two lower tapped holes 321e, 321e of the fixed part 321b or 321a of the third right angle panel 321 and into the two upper long holes 312c, 312c of the flat installing portion 312a of the second angle panel 312 arranged on the lower right of the third right angle panel 321. On the other hand, screws are inserted through the two upper tapped holes 321e, 321e of the fixed part 321b or 321a of the third right angle panel 321 and into the two lower long holes 312c, 312c of the flat installing portion 312a of the second angle panel 312 arranged on the upper right of the third right angle panel 321.

The third left angle panel 322 is formed as shown in FIG. 32, having a symmetrical form that is a mirror image of the aforementioned third right angle panel 321 (FIG. 31).

The third left angle panel 322 has (1) flat installing portions 322c, 322d for affixing said panel 321 to the left side of the small disk drive 330 that is stacked above the uppermost of the large disk drive (310), and (2) fixed parts 322b, 322a, which are formed in the shape of a crank and that extend outwards to the left from said flat installing portions 322c, 322d for use in affixing, by using screws, said left angle panel 322 to the flat installing portion 312a of the second angle panel 312 that is arranged on the left side of the uppermost large disk drive (310).

Both of the flat installing portions 322c, 322d are provided with one long through-hole 322f, 322f (two long through-holes in total), which are holes through which screws are inserted into the left side tapped holes of a small disk drive 330 or 320.

Both of the fixed parts 322b, 322a are provided with two long tapped holes 322e, one below and one above the longitudinal centerline of said right angle panel 322—i.e., a total of four tapped holes 322e, 322e, 322e, 322e (two holes x two rows)—through which screws are inserted into the flat installing portions 312a, 312a of the two vertically arranged left-side second angle panels 312, 312.

Screws are inserted through the two lower tapped holes 322e, 322e of the fixed part 322b or 322a of the third left angle panel 322 and into the two upper long holes 312c, 312c of the flat installing portion 312a of the second angle panel 312 arranged on the lower left of the third left angle panel 322. On the other hand, screws are inserted through the two upper tapped holes 322e, 322e of the fixed part 322b or 322a of the third left angle panel 322 and into the two lower long holes 312c, 312c of the flat installing portion 312a of the second angle panel 312 arranged on the upper left of the third left angle panel 322.

Therefore, the flat installing portions 312a, 312a of the left-side and right-side second angle panels 312, 312 are affixed, by using screws, so that the left and right sides of said panels 312 align with their corresponding left and right sides (vertically) of the fixed parts (322b, 322a), (321b, 321a) of the left-side and right-side third angle panels 322 and 321.

In accordance with this, a plurality of the small disk drives 330, 320, 320, -, 320 can be successively stacked by using a plurality pairs of the left-side and right-side second angle panels (312, 312), -, (312, 312). (See FIGS. 22 and 23.)

The upper end of the flat installing portion 311b of the first angle panel 311 and the lower end of the flat installing portion 312a of the second angle panel 312 are provided with engagement parts 311d and 312d that are to contact each other in order to fix the relative positions of said angle panels 311 and 312. Further, the upper end of the flat installing portion 312a of the second angle panel 312 has an engagement part 312b that is to contact an engagement part 312d of the lower end of the flat installing portion 312a of the other second angle panel 312 in order to fix the relative positions of said two angle panels 312, which are to be arranged vertically.

The first angle panels 311, the second angle panel 312s are provided with the engagement parts 311d, 312d, 312b so as to contact each other in order to fix the relative positions of said angle panels.

Therefore, by using a pair of the left-side and right-side first angle panels 311, 311, a plurality of the left-side and right-side second angle panels (312, 312), -, (312, 312), and the left-side and right-side third angle panels (322, 321), -, (322, 321), it is possible to arrange and to fix the positions of the large and small disk drives 310, 330, 320, and to ensure assembly without slippage between the front and rear ends of each other.

In this embodiment, the motherboard bay 340 that houses boards, including a motherboard, is affixed directly, as shown in FIG. 21, to the outer frame on the right side of the bottom of the case 200 by using a plurality of (in FIG. 21, five) board-installing angles 341, 341, -, 341 and is affixed to the frame 210a which is arranged horizontally and fixed by screws along the middle part of the outer frame on the right side of the case 200. This arrangement is different from a conventional motherboard bay and from the inner frame 21 of the first embodiment. Because the board-installing angles 341 have a compact and simple structure (as described in detail below), the case for computer of this embodiment is lightweight, small-footprint and easy to disassemble.

Figure 33:
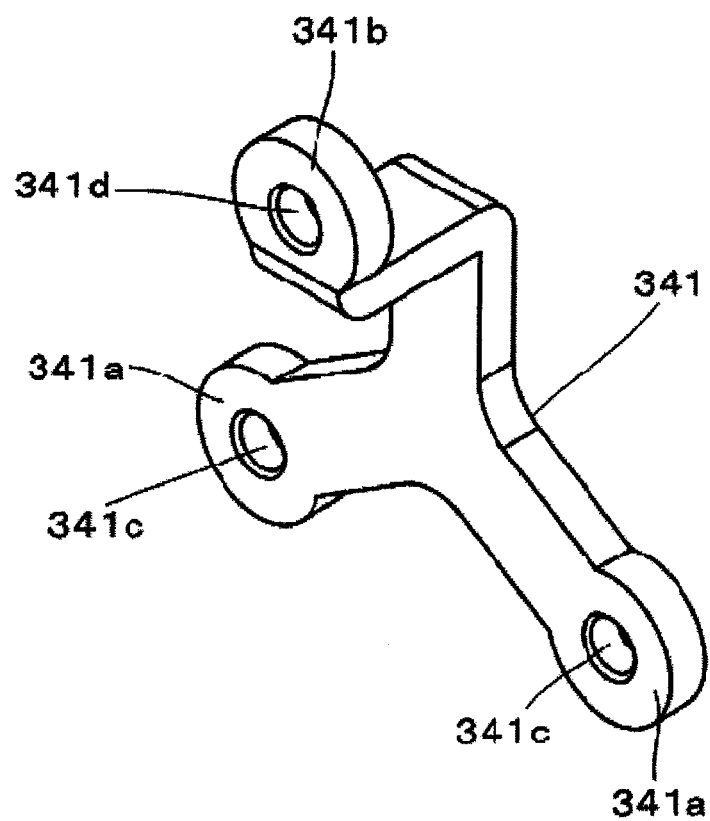
FIG. 33 is a perspective view of an board-installing angle in the second embodiment of the present invention.

FIG. 33 is a perspective view of a board-installing angle of this embodiment.

The board-installing angle 341 is formed as a thin piece having three round projections. Said board-installing angle 341 is provided with two arms, the fixing parts 341a, 341a, that are affixed, by using screws, to the (right-side) outer frame of the bottom of the case 200 or to the frame 210a, and a single arm, an installing part 341b, which extends from the mid-point between the two fixing parts (arms) 341a, 341a and projects in the forward direction of the figure, and that is affixed, by using a screw, to the rear of the motherboard bay 340.

The fixing parts 341a, 341a are each provided with one through-hole 341c, 341c, and the installing part 341b also is provided with one through-hole 341d. The two through-holes 341c, 341c of the fixing parts 341a, 341a are holes for fixing the board-installing angle 341 to the angle-type rear face of the outer frame on the right side of the bottom or to the rear face of the affixing-frame 210a by using screws. While the through-hole 341d of the installing part 341b is a hole for fixing the board-installing angle 341 to the rear of the motherboard bay 340 (See FIG. 21).

The through-holes 341c, 341c, 341d can be either holes for screws or tapped holes.

In this embodiment, as shown in FIG. 21, the power module bay 350 for housing the power module is directly affixed to the rear panel 230 of the case 200 by using power angles 351 and a power panel (not shown).

This arrangement is different from a conventional power module bay and from using the frame member 102f of the first embodiment. Because the power angles 351 have a compact, lightweight and simple structure (as described in detail below), the case for computer of this embodiment can be lightweight, small-footprint and easy to disassemble.

Figure 34:
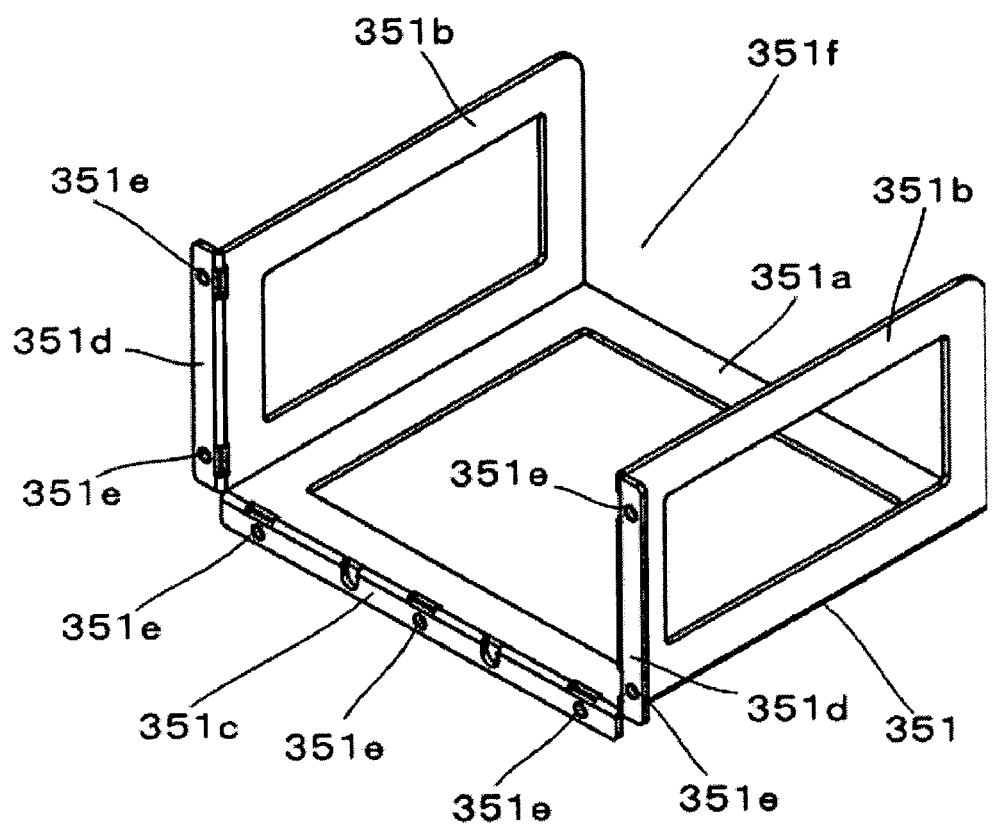
FIG. 34 is a perspective view of a power angle for installing a power source in the second embodiment of the present invention.

FIG. 34 is a perspective view of the power angle of this embodiment.

The power angle 351 is formed in an approximate U shape and is made of thin panels. It is provided with a power-module space 351f that is surrounded by flat panels 351a, 351b, 351b that are formed in the shape of a U, and fixing flanges 351c, 351d, 351d, that are formed by bending the forward-side ends of the flat panels 351a, 351b, 351b outwards so that the power angle 351 can be affixed, by using screws, to the rear panel 230, which is the outer panel of the case 200. The central parts of the flat panels 351a, 351b, 351b are provided with rectangular holes (numerals omitted) so as to make said flat panels lightweight and able to provide the power module with good radiation of heat.

The fixing flanges 351c, 351d, 351d are provided with a plurality of (in FIG. 34, each three, two, two, total of seven holes) through-holes 351e, 351 e, -, 351e, through which screws are inserted for affixing these fixing flanges to the rear panel 230 (See FIG. 21). The through-holes 351e can be either holes for screws or tapped holes.

In this embodiment, a fan module bay 360 that houses a fan module containing a fan-installing panel 361 is affixed directly to the rear panel 230 of the case 200 as shown in FIG. 21. Because the fan-installing panel 361 is compact, lightweight and simple structure of flat rectangular shape (not shown), and has a plurality of openings for ventilation, differing in this respect from the arrangement for a fan module bay of a conventional personal computer, the case for computer of this embodiment can be lightweight, small-footprint and easy to disassemble.

Figure 24:
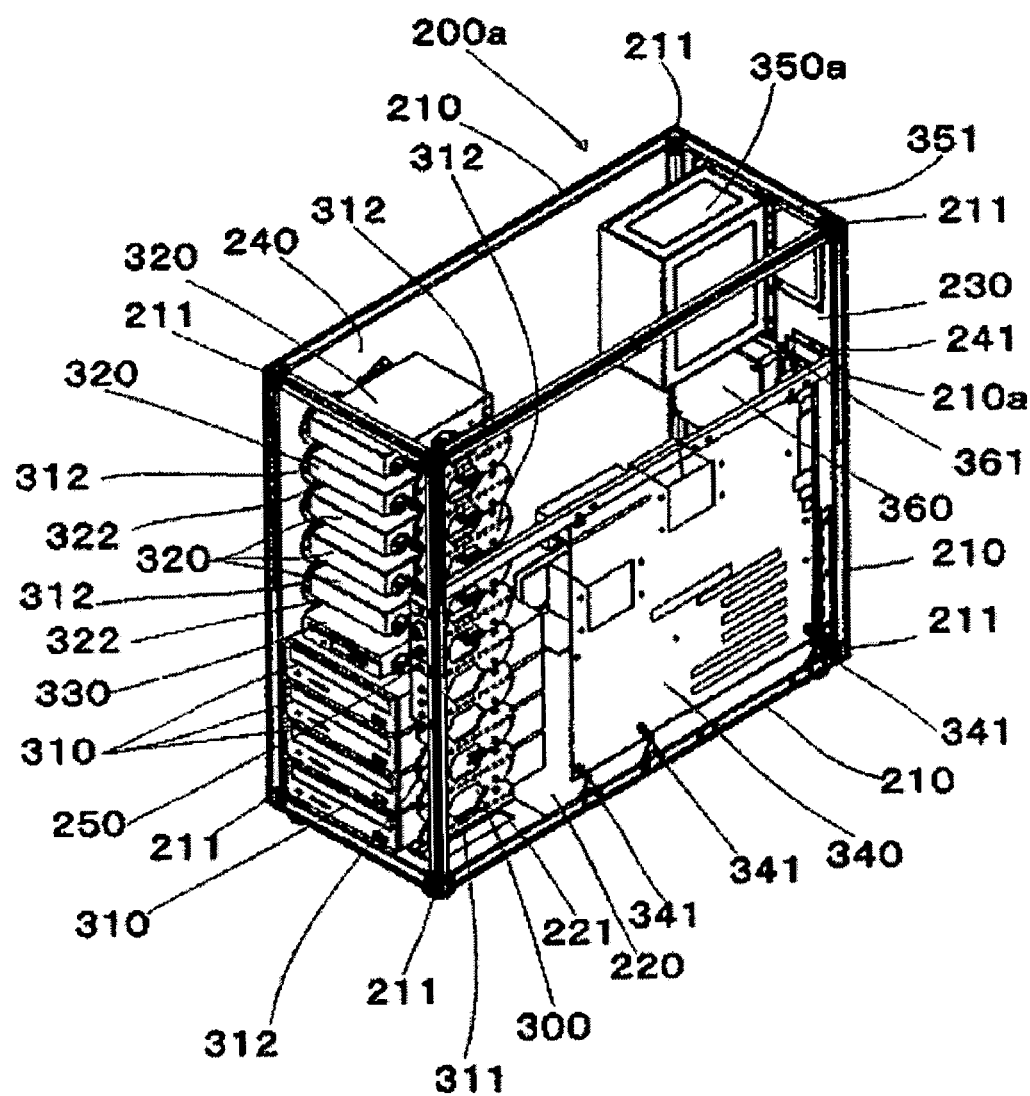
FIG. 24 is a perspective view from the front of a case for computer that has its front panel removed and that is a third embodiment of the present invention.

Next, a third embodiment of the present invention is also applied to a full-tower-type computer. In this embodiment, a case for computer consists only of a single case 200a, as shown in FIG. 24, which is a perspective view of the case for computer with outer panels partly removed.

The construction of the case 200a is the same as that of the case 200 of the second embodiment, except that—in contrast to the case 200, in which the power source of the power module 350 is horizontally affixed to the rear panel 230—the power source of the power module 350a of the case 200a is affixed to the rear panel 230 under the condition that the power source is rotated by 90 degree (counter-clockwise when viewed from the front). Therefore, in FIG. 24, the same components are referred to by using the same numerals as those of the case 200, and therefore a detailed explanation of the case is omitted here.

In this embodiment, the case for computer provides a user with both freedom for arranging devices as desired and ease of disassembly, because incidental devices (such as the power module, fan module, and the like) are installed by using installing members (such as the power angles and the fan-installing panel) that are affixed to the outer panel (such as the rear panel 230) of the case.

Figure 25:
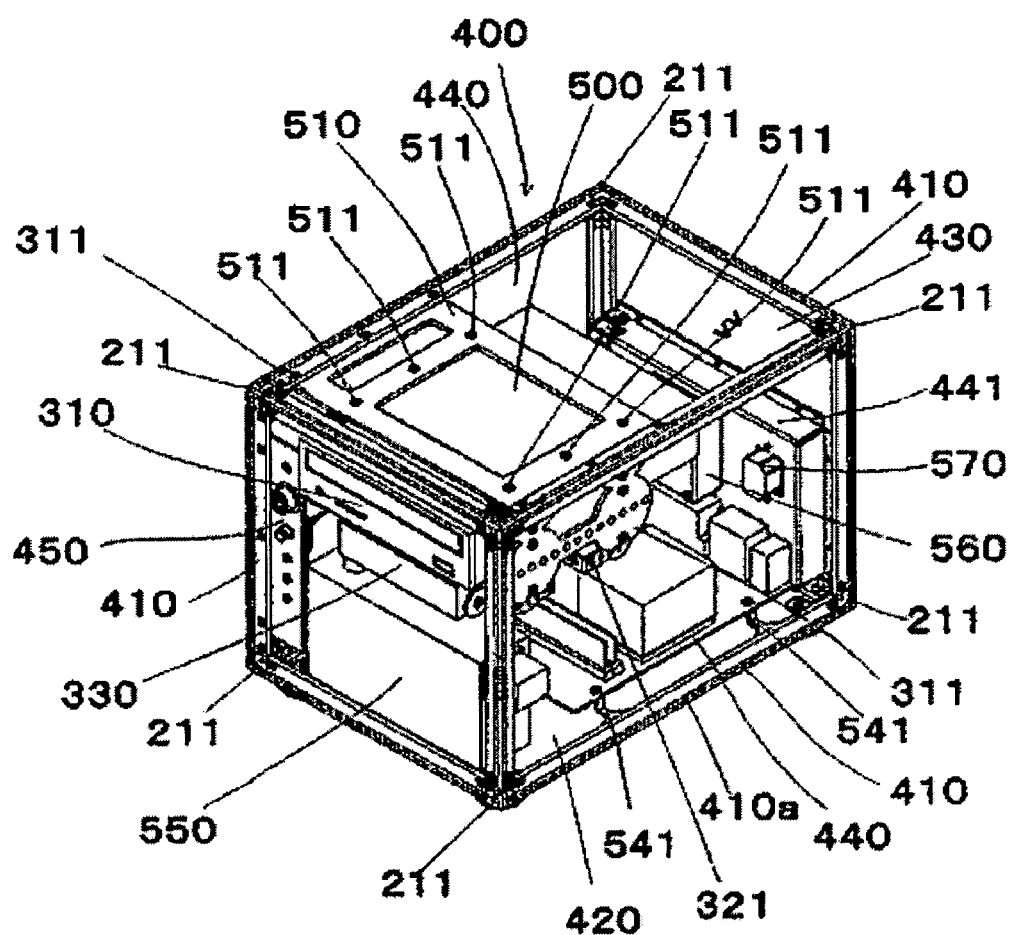
FIG. 25 is a perspective view from the front of a case for computer that has its front panel removed and that is a fourth embodiment of the present invention.
Figure 26:
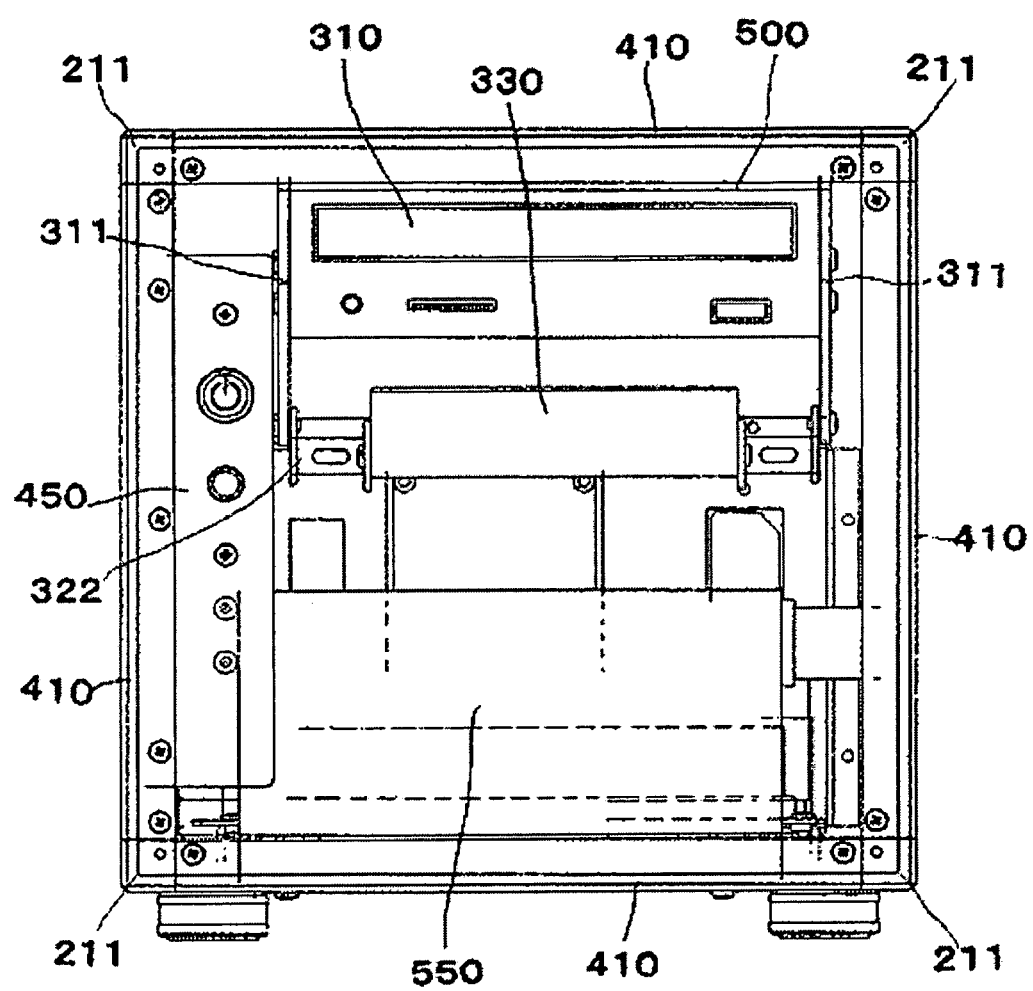
FIG. 26 is a front view of the case for computer shown in FIG. 25.
Figure 27:
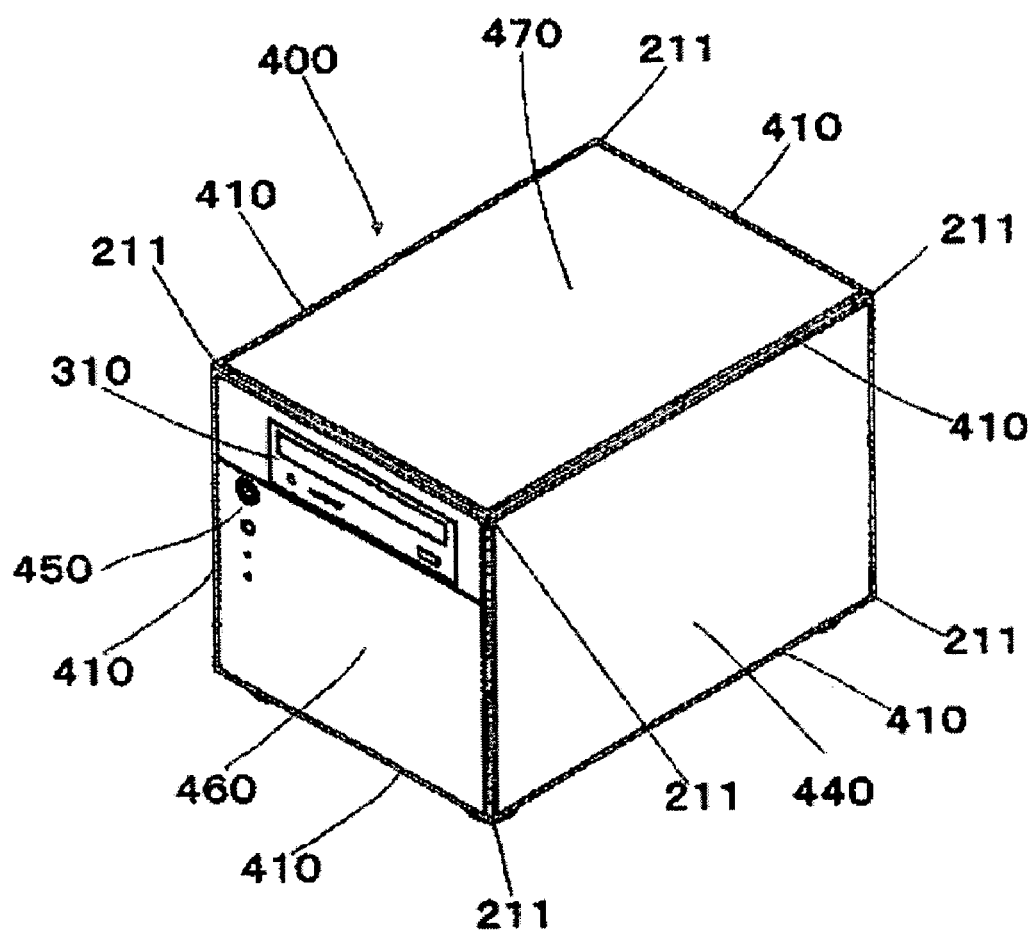
FIG. 27 is a perspective view from the front of a case for computer that is a fourth embodiment of the present invention.

Next, a fourth embodiment of the present invention is applied to a minitower- or micro-tower-type computer, In this embodiment, a case for computer consists only of a single case, 400 as shown in FIGS. 25 through 27.

FIG. 25 is a perspective view from the front-left side of the case with the outer panels partly removed; FIG. 26 is a front view of the case; and FIG. 27 is a front perspective view of the exterior of the case. In FIGS. 25 through 27, the same components have the same shapes as those of the aforementioned embodiments and therefore are referred to by using the same numerals.

The case 400 of this embodiment houses, as shown in FIG. 25, an large external storage module such as a 5-inch disk drive 310, an internal storage module such as a 3.5-inch disk drive 330, a motherboard bay 440 that contains boards, including a motherboard, and other devices (not all of which are shown) for a PC. Moreover, a power-bay module 550 and a fan module bay 560 are housed in the case 400.

The front of the case 400 is provided with switches (such as a main switch to start the computer and a reset switch to restart the computer) and an SW-LED panel 450, on which indicator lamps such as a power indicator lamp and an access lamp are properly arranged. The rear of the case 400 is provided with a connector panel 441 on which connectors that connect with a power supply, a display, scanner, other computers, and electronic devices for communication, and other devices are arranged.

The case 400, as shown in FIGS. 25 and 27, is provided with (1) a frame member 410, and (2) a plurality of outer panels: (a) a bottom panel 420, (b) a rear panel 430, (c) left-side or right-side panel 440, (d) a front panel 460, and (e) a top panel 470—all of which are affixed to the outside of the frame member 410. FIG. 25 shows a case having a bottom panel 420, a rear panel 430, and a left-side panel 440 as the outer panels, and without a front panel 460, a right-side panel 440, and a top panel 470.

The frame member 410 form outline of a solid shape of the case 400 such that, when the outer panels 420, 430, 440, 440, 460, and 470 are affixed to the frame member 410, the case will be a rectangular parallelepiped as shown in FIGS. 25 and 27.

The frame member 410 is formed by a plurality of outer frames and a plurality of corner parts 211, with said outer frames and corner parts assembled together by using screws in a similar manner to that of the second and the third embodiments. In this arrangement, the frame member 410 is easily formed by using screws to directly connect a plurality of the outer frames with the corner parts, except for the inner frames of the first embodiment, resulting in easy disassembly.

As shown in FIGS. 25 and 26, in the case 400, a disk-drive bay 500, in which one large and one small disk drive 310 and 330 are stacked one upon the other, is provided with (1) left-side and right-side first angle panels 311, 311 (the same shape as in the second and third embodiments) that are affixed on the bottom (back side) of the bay-affixing panel 510 that is affixed to the top outer panel of the case 400, and that sustain the large disk drive 310 from the left and right sides, and (2) a pair of the left-side and right-side third angle panels 322, 321 (the same shape as in the second and third embodiments) that are affixed to the left-side and right-side first angle panels 311, 311, and sustain from the left and right sides the small disk drive 330 that is arranged under the large disk drive 310.

In this embodiment, the first angle panels 311, the left-side and right-side third angle panels 322 and 321 that have the same shape as in the second and third embodiments can be installed upside down.

Therefore, the large and small disk drives 310 and 330 can be stacked, and can be installed by a pair of the first angle panels 311, 311, the third left- and right-angle panels 322 and 321, and using screws, resulting in easy disassembly.

In this embodiment, the case 400 for a micro- or minitower-type computer can be formed so as to be compact and light-weight by affixing (pendently) the disk-drive bay 500—in which the large and small disk drives 310 and 330 are stacked by using a pair of first angle panels 310, 310 and third left-side and right-side angle panels 322 and 321—directly to the lower side of the module-affixing panel 510 in the upper part of the case 400. Further, the case and the related components housed in the case can be disassembled and transported, avoiding the need for a bulky package and greatly reducing the cost of transporting them.

In this embodiment, the motherboard bay 540 which houses one or more boards such as a motherboard and the like, is affixed to the outer frames 410a, 410a on the left and right sides of the bottom side of the case 400 by using a plurality of the board-installing angles 541, 541, -, 541 (in the figure, two each on the left and right sides), as shown in FIG. 25. This arrangement is different from the arrangement for a motherboard bay in a conventional personal computer and the arrangement using the inner frames of the first embodiment. Because the board-installing angle 441 has a compact and simple structure (as described in detail below), the case for computer of this embodiment can be lightweight, small-footprint, and easy to disassemble, The board-installing angle 441 is formed as a thin piece having three round projections, identical to the board-installing angle 341 of the second embodiment (See FIG. 33) and therefore a detailed explanation is omitted here.

In this embodiment, the power-bay module 550 that houses the power module has a simple structure, as shown in FIG. 25, being affixed directly to the bottom panel 420 of the bottom of the case 400. As a result, a power-bay module of a conventional personal computer and the frame module 102f in the first embodiment and other components for installing a power-bay module are not necessary, so that additional saving of space and a lower weight can be attained, resulting in easy disassembly.

In this embodiment, the fan module bay 560 that houses the fan module has a simple structure, as shown in FIG. 25, being affixed directly, by using screws, to the rear connector panel 441 (box shape by thin plates) that is affixed to the rear panel 430 of the case 400. In this respect the arrangement of fan module bay 560 and the components thereof to be installed, differs from the fan module bay of publicly known conventional personal computers, and the case for computer thus saves additional space and promotes greater ease of disassembly.

In the second, third and fourth embodiments described above, the first and the second angle panels 311, 312, and the third left and right angle panels 322 and 321 have respectively the same shapes.

Therefore, the first, second, and third left and right angle panels can be used in common for a variety of case for computers, ranging from (1) large full-tower types in which a plurality of large and small internal/external storage modules (disk drives) are stacked, (2) middle-tower types that contain fewer disk drives than the full-tower types do, and (3) mini-tower types in which at least one large disk drive and one small disk drive are stacked. Accordingly, the costs of designing and manufacturing bays for internal/external storage module bays (disk drive bays) are reduced, so that a user can freely and enjoyably select whatever type and design of case is desired, facilitating the addition of expansion modules into the case. Further, the case and the bays for the internal/external storage modules can be disassembled simply by removing the screws used in assembly, thereby avoiding the need for a bulky package and greatly reducing the cost of transporting the computer.

The present invention is flexible and not limited to the above embodiments. For example, a case can have a simple arrangement such that outer panels are affixed to outside of a single frame member of a solid shape. Also, the exterior of the case can have a different form from any of the embodiments shown in the figures and the shape of the inner frames, the corner parts, the outer frames, and the outer panels can be changed correspondingly. Further, the number of tapped holes and through-holes can be changed arbitrarily, and the decorative screws can have a shape different than that shown in FIG. 16.

INDUSTRIAL APPLICABILITY

The case for computer of the present invention as described above has the excellent effects summarized below:

By selecting the components of the frame members and the outer panels (including the size, material, and finish), a user can enjoyably and freely design a case for computer, and can later modify the design as desired, thereby obtaining a case for computer that reflects his or her own unique preferences.

Because this invention makes it easy to add an additional module to the case, the additional module can easily be added as desired, which also eliminates the disorderly or even messy appearance.

Because the motherboard-bay, power module bay, fan module bay, and the like are small-footprint, lightweight and simple in style, the case for computer is compact and light-weight.

Further, the case and the devices for a PC can be easily disassembled for transporting, simply by removing screws, thereby avoiding the need for a bulky package and greatly reducing the cost of transporting the case.

What is claimed is:

1. A case for computer having a solid shape formed by a plurality of outer panels assembled together, and into which are installed bays for mounting modules for computer, comprising at least switches and insertion/removal openings for external storage modules on front side and at least connectors on rear side;

wherein
(1) frame members form an outline of the solid shape, comprise
 (a) outer frames that are arranged so as to form outline of each plane of the solid shape,
 (b) corner parts that are arranged at corners of the solid shape and that connect adjacent outer frames,
(2) the outer frames and the corner parts are assembled by using screws, so that the case is easy to disassemble
(3) the outer panels are removably installed by using screws on outside of the corner parts of the frame members,
(4) a disk-drive bay in which a plurality of a large disk drives serving as an internal and external storage, modules can be installed, with disk-drive bay comprising:
 (i) a pair of left-side and right-side first angle panels that (a) are arranged across two vertically stacked large disk drives and sustain the two drives from their respective sides, and (b) affixed to top face of a bay-fixing panel that is affixed to an outer frame that forms bottom plane of the case, and
 (ii) a plurality of left-side and right-side second angle panels that (a) are sequentially arranged across adjacent two of a plurality of vertically stacked large disk drives that are placed on the afore-mentioned upper large hard disk drive, and (b) sustain the two adjacent drives from their respective sides.

2. A case for computer as described in claim 1, wherein
a disk-drive bay in which a plurality of large and small disk drives serving as internal and external storage modules can be installed under the condition that they are stacked, with the disk-drive bay comprising:
left-side and right-side third angle panels that (a) sustain a small disk drive that is stacked atop the uppermost large disk drive from its respective sides, and (b) are affixed respectively to the left-side and right-side second angle panels that are arranged at the uppermost large disk drive,
and wherein
a plurality of second angle panels that have the same shape as the aforementioned second angle panels, can be installed consecutively (1) by being arranged across vertically adjacent two of a plurality of third left-side and right-side third angle panels that have the same shape as the aforementioned third angle panels, and that sustain one by one a plurality of small disk drives that are stacked successively on top of the aforementioned small disk drive from their respective sides, and
(2) by fixing the two adjacent third angle panels, and a plurality of aforementioned large and small disk drives are stacked, through (a) the pair of the left-side and right-side first panels, (b) the plurality pairs of the second, left-side and right-side panels, and (c) the left-side and right-side third angle panels, being affixed to the panels by using screws, so that the case is easy to disassemble.

3. A case for computer as described in claim 2, wherein
(1) the left and right side first angle panels
 (a) have a fixing flange to be affixed to top face of the bay-fixing panel by using screws, and (b) have flat installing portions that are installed consecutively to the fixing flange and are inflected into L-shaped cross-section and are arranged across the two vertically adjacent large hard disk drives and are affixed to the sides of the two drives by using screws,
(2) the second angle panels have flat installing portions that are arranged across the two vertically adjacent large hard disk drives and are affixed to the sides of the two drives by using screws,
(3) the left-side and right-side third angle panels have
 (a) flat installing portions that are installed, by using screws, to their respective sides of a small disk drive that is stacked on the uppermost of the stack of large disk drives, and (b) fixed parts that are installed consecutively to the flat installing portions of the third angle panels and are inflected into a crank-shaped cross-section so as to protrude outwards to both left and right sides and that are to be affixed, by using screws, to the flat installing portions of the second left-side and right-side angle panels that are arranged atop the uppermost large disk drives, and that is such that
(4) the flat installing portions of the second angle panels and the fixed parts of the left-side and right-side third angle panels can be arranged across and connected with vertically adjacent two each other.

4. A case for computer as described in claim 3, wherein
(1) engagement parts on upper end of the flat installing portions of the first angle panels and lower end of the flat installing portions of the second angle panels so as to fix position at which the first and second panels contact each other, and
(2) other engagement parts on the upper end of the flat installing portions of the second angle panels and the lower end of the flat installing portions of the other second angle panels, which are arranged in such a way that said other second angle panels are adjacent to each other, so as to fix position at which said first and second angle panels contact each other.

5. A case for computer as described in claim 2, wherein a disk-drive bay in which at least one of each large and small disk drives can be installed under the condition that they are stacked, with said disk-drive bay comprising
(1) a pair of left-side and right-side first angle panels that sustain the large disk drive(s) from their respective sides, and affixed to bottom face of a bay-fixing panel that is affixed to an outer frame that forms top plane of the case
(2) left-side and right-side third angle panels that (a) hold a small disk drive that is placed at the bottom of the large disk drive from its respective sides, and (b) are affixed respectively to the left-side and right-side first angle panels
(3) the large and small disk drives are stacked, through pairs of said left-side and right-side first and third angle panels, being affixed to the left and right side first and third angle panels by using screws, so that the large and small disk drives can easily be removed.

6. A case for computer as described in claim 5,
wherein the pair of left-side and right-side first angle panels and left-side and right-side third angle panels as described in claim 5, with said first angle panels having the same shape as those of the first angle panels in claim 3 or claim 4, and said third angle panels having the same shape as the left-side and right-side third angle panels in claim 3.

7. A case for computer having a solid shape formed by a plurality of outer panels assembled together, and into which are installed bays for mounting modules for computer, comprising at least switches and insertion/removal openings for external storage modules on front side and at least connectors on rear side;

wherein (1) frame members form an outline of the solid shape, comprise,
   (a) outer frames that are arranged so as to form outline of each plane of the solid shape, and
   (b) corner parts that are arranged at corners of the solid shape and that connect the adjacent outer frames,
(2) the outer frames and the corner parts are assembled together by using screws, so that the case is easy to disassemble,
(3) the outer panels are removably installed by using screws on outside of the corner parts of the frame members,
(4) a disk-drive bay in which a plurality of large and small disk drives serving as internal and external storage modules can be installed under the condition that they are stacked, with the disk-drive bay comprising:
   (i) a pair of left-side and right-side first angle panels that (a) sustain the large drive from their respective sides, and (b) affixed to a bottom face of a bay-fixing panel that is affixed to an outer frame that forms a top plane of the case, and
   (ii) left-side and right-side third angle panels that (a) sustain a small disk drive that is stacked on a bottom part of the large disk drive from its respective sides, and (b) are affixed respectively to the left-side and right-side first angle panels that are arranged at the bottom part of the large disk drive, and
(5) the large and small disk drives are assembled, being affixed by using screws to the pair of the left-side and right-side first panels and the pair of the left-side and right-side third angles, so that the case is easy to disassemble.

* * * * *